US011417250B2

(12) United States Patent
Li et al.

(10) Patent No.: US 11,417,250 B2
(45) Date of Patent: Aug. 16, 2022

(54) SYSTEMS AND METHODS OF REDUCING HYSTERESIS FOR DISPLAY COMPONENT CONTROL AND IMPROVING PARAMETER EXTRACTION

(71) Applicant: Apple Inc., Cupertino, CA (US)

(72) Inventors: Yongjun Li, Fremont, CA (US); Jiayi Jin, Redwood City, CA (US); Maofeng Yang, San Jose, CA (US); Jun Li, San Jose, CA (US); Weijun Yao, Saratoga, CA (US); Derek K. Shaeffer, Redwood City, CA (US); Baris Cagdaser, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/146,997

(22) Filed: Sep. 28, 2018

(65) Prior Publication Data

US 2019/0057633 A1 Feb. 21, 2019

Related U.S. Application Data

(63) Continuation-in-part of application No. PCT/US2018/026103, filed on Apr. 4, 2018, which is (Continued)

(51) Int. Cl.
*G09G 3/00* (2006.01)
*G06F 3/048* (2013.01)
(Continued)

(52) U.S. Cl.
CPC ............. *G09G 3/006* (2013.01); *G06F 3/048* (2013.01); *G09G 3/3225* (2013.01); (Continued)

(58) Field of Classification Search
CPC .......... G09G 3/3233–3258; G09G 2320/0285; G09G 2320/043; G09G 3/006;
(Continued)

(56) References Cited

U.S. PATENT DOCUMENTS

2002/0090470 A1 7/2002 Kubota et al.
2006/0170368 A1 8/2006 Jang
(Continued)

FOREIGN PATENT DOCUMENTS

KR 20100034559 A * 4/2010 ........... G09G 3/3266

OTHER PUBLICATIONS

PCT Search Report and Written Opinion for PCT/US2018/026103 dated Jul. 2, 2018, 21 pages.

*Primary Examiner* — Amr A Awad
*Assistant Examiner* — Aaron Midkiff
(74) *Attorney, Agent, or Firm* — Fletcher Yoder, P.C.

(57) ABSTRACT

A method of adjusting a test gray voltages applied to a component of an electronic display during a test frame between image frames, wherein the adjustment is based at least in part on the control signal to the component during a prior image frame. The method may reduce hysteresis effects on the extraction of sensed currents of the component during the test frame, which may increase the accuracy and/or consistency of determined parameters evaluated from the sensed currents. The determined parameters may include temperature and/or aging of the component. The determined parameters may be used to adjust control signals for the component and other components in a region near the component during the next image frame.

19 Claims, 13 Drawing Sheets

Related U.S. Application Data a continuation of application No. 15/711,679, filed on Sep. 21, 2017, now abandoned.

(60) Provisional application No. 62/506,388, filed on May 15, 2017.

(51) Int. Cl.

| | | |
|---|---|---|
| *G09G 3/3258* | (2016.01) | |
| *G09G 3/3225* | (2016.01) | |
| *G09G 3/3233* | (2016.01) | |
| G09G 3/20 | (2006.01) | |
| G09G 3/3266 | (2016.01) | |
| G09G 3/3275 | (2016.01) | |

(52) U.S. Cl.
CPC ......... *G09G 3/3233* (2013.01); *G09G 3/3258* (2013.01); *G09G 3/2003* (2013.01); *G09G 3/3266* (2013.01); *G09G 3/3275* (2013.01); *G09G 2310/08* (2013.01); *G09G 2320/0233* (2013.01); *G09G 2320/0242* (2013.01); *G09G 2320/0252* (2013.01); *G09G 2320/0257* (2013.01); *G09G 2320/0285* (2013.01); *G09G 2320/041* (2013.01); *G09G 2330/021* (2013.01); *G09G 2330/12* (2013.01); *G09G 2360/16* (2013.01)

(58) Field of Classification Search
CPC .. G09G 3/2003; G09G 3/3225; G09G 3/3266; G09G 3/3275; G09G 2310/08; G09G 2320/0233; G09G 2320/0242; G09G 2320/0252; G09G 2320/0257; G09G 2320/029; G09G 2320/0295; G09G 2320/0626; G09G 2330/021; G09G 2330/12; G09G 2360/16; G09G 3/32–3291; G09G 2320/041–045; G09G 3/3644; G09G 3/3666; G06F 3/048

See application file for complete search history.

(56) References Cited

U.S. PATENT DOCUMENTS

| | | | |
|---|---|---|---|
| 2007/0182694 | A1 | 8/2007 | Lee et al. |
| 2007/0210996 | A1 | 9/2007 | Mizukoshi et al. |
| 2008/0284688 | A1* | 11/2008 | Marx .................. G09G 3/3233 345/76 |
| 2009/0256854 | A1 | 10/2009 | Mizukoshi et al. |
| 2009/0284513 | A1 | 11/2009 | Weindorf et al. |
| 2009/0299543 | A1 | 12/2009 | Cox et al. |
| 2010/0066257 | A1 | 3/2010 | Lin et al. |
| 2010/0225630 | A1 | 9/2010 | Levey |
| 2010/0225634 | A1* | 9/2010 | Levey .................. G09G 3/3208 345/212 |
| 2014/0111499 | A1 | 4/2014 | Jang et al. |
| 2014/0124773 | A1* | 5/2014 | Yamazaki ............... H01L 27/32 257/40 |
| 2015/0115826 | A1 | 4/2015 | Koo et al. |
| 2015/0138179 | A1* | 5/2015 | Park ..................... G09G 3/3233 345/212 |
| 2015/0154908 | A1 | 6/2015 | Nam et al. |
| 2016/0111044 | A1* | 4/2016 | Kishi .................. G09G 3/3233 345/690 |
| 2017/0053590 | A1 | 2/2017 | Song et al. |
| 2018/0082640 | A1* | 3/2018 | Min ..................... G09G 3/3233 |

* cited by examiner

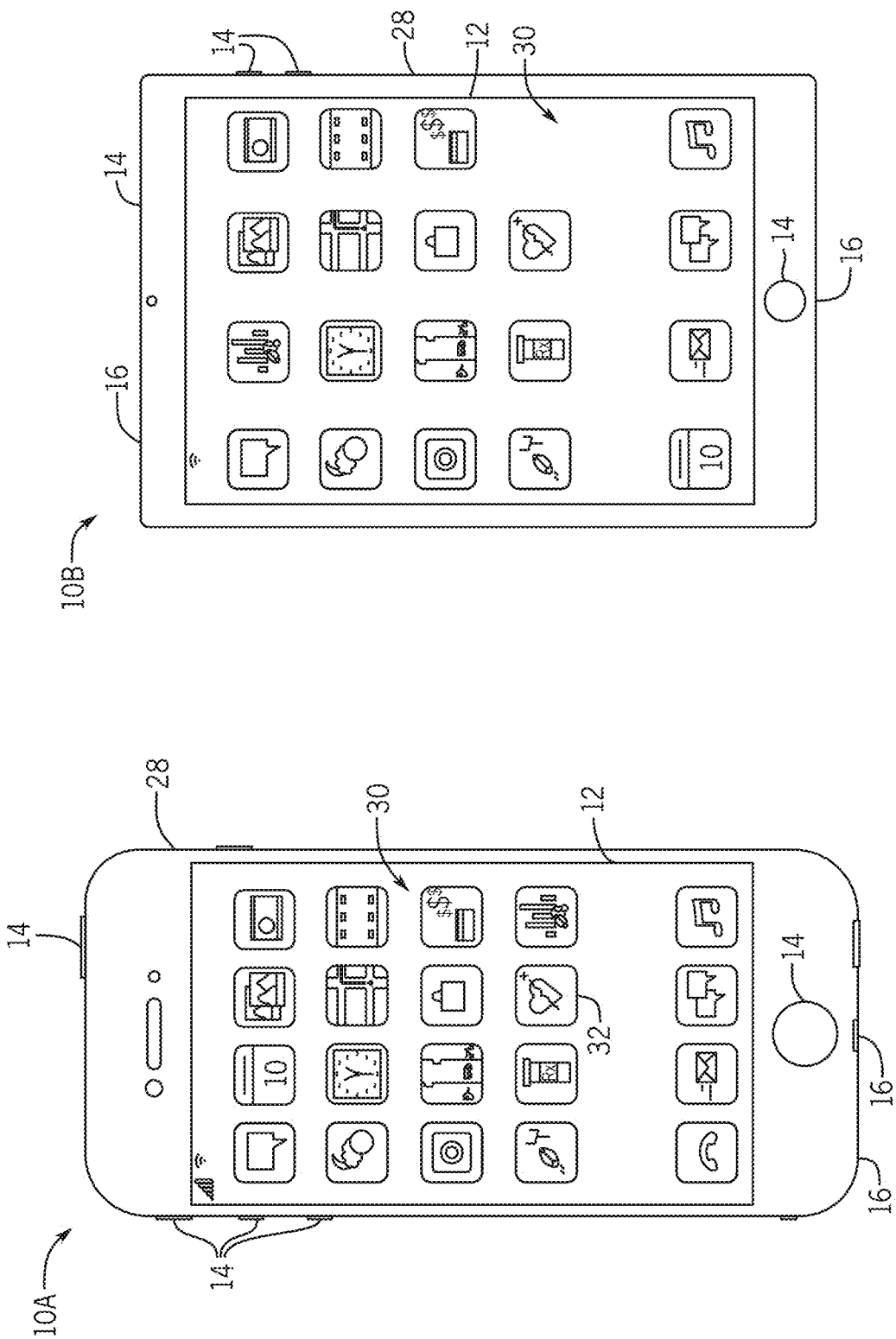

SYSTEMS AND METHODS OF REDUCING HYSTERESIS FOR DISPLAY COMPONENT CONTROL AND IMPROVING PARAMETER EXTRACTION

CROSS REFERENCE TO RELATED APPLICATIONS

This application is a continuation-in-part of International Application No. PCT/US2018/026103, filed Apr. 4, 2018, and entitled "Systems and Methods of Utilizing Output of Display Component for Display Temperature Compensation", which claimed priority to U.S. patent application Ser. No. 15/711,679, filed Sep. 21, 2017, and entitled "Systems and Methods of Utilizing Output of Display Component for Display Temperature Compensation", which claimed priority to U.S. Provisional Patent Application No. 62/506,388, filed May 15, 2017, and entitled "Systems and Methods of Utilizing Output of Display Component for Display Temperature Compensation", all of which are herein incorporated by reference in their entireties and for all purposes.

BACKGROUND

The present disclosure relates generally to electronic displays and, more particularly, accurately measuring temperatures of the electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use electronic displays to present visual representations of information as text, still images, and/or video by displaying one or more image frames. For example, such electronic devices may include computers, mobile phones, portable media devices, tablets, televisions, virtual-reality headsets, vehicle dashboards, and wearable devices, among many others. To accurately display an image frame, an electronic display may control light emission (e.g., luminance) from its display pixels. However, output of components of a display pixel may be affected by the output (e.g., light emission, current) of the component during one or more previous image frames, a phenomenon known as hysteresis. The hysteresis exhibited by the components of the electronic display may affect perceived image quality of the electronic display, for example, by producing ghost images, mura effects, or inaccurate colors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays and, more particularly, to improving response time of electronic displays. Generally, an electronic display may display an image frame by programming display pixels with image data and instructing the display pixels to emit light. The image data provided for a display pixel may include a first or target luminance (e.g., brightness) and a first or target color (e.g., chromaticity) with which to display the image data. During operation, the display pixel of the electronic display may display the image data of the image frame at the first luminance and the first color for at least a portion of a first display period. The display pixel may display subsequent image data of the image frame at a second luminance and a second color for at least a portion of the subsequent second display period. However, the output of a component of the display pixel during the second display period may change due to the control signals for the first luminance and the first color. This dependence of the output of the component during one display period upon a previous display period is referred to as hysteresis.

To reduce the likelihood that hysteresis may affect the perceived image quality of a subsequent image frame, the electronic display may determine the temperature of the component and adjust subsequent signals to the component based on the temperature. In particular, the temperature of the component may be determined based on a derived relationship between two or more inputs (e.g., gate voltages) to the component, two or more outputs (e.g., currents) from the component, and the temperature. Two or more test signals applied to the component may yield an intermediate value for comparison with reference temperature data to determine the temperature of the component. This intermediate value may be related to temperature of the component, yet largely independent of hysteresis. The temperature of the component may be correlated with a threshold voltage shift to determine an appropriate compensation to control signals to the component.

The inputs to the component for an image frame may affect the outputs, such as sensed current levels, during a sensing period between image frames. Extraction error during a sensing period between frames may affect the intermediate values extracted from the sensing period that are used to determine subsequent signals to the component. Adjustment to the applied inputs during the sensing period based on the previous inputs affect the sensed outputs during the sensing period, thereby enabling compensation of the sensed outputs used to determine the intermediate values and subsequent signals to the component.

BRIEF DESCRIPTION OF THE DRAWINGS

Various aspects of this disclosure may be better understood upon reading the following detailed description and upon reference to the drawings in which:

FIG. 2 is one example of the electronic device of FIG. 1, in accordance with an embodiment of the present disclosure;

FIG. 3 is another example of the electronic device of FIG. 1, in accordance with an embodiment of the present disclosure;

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

Figure 1:
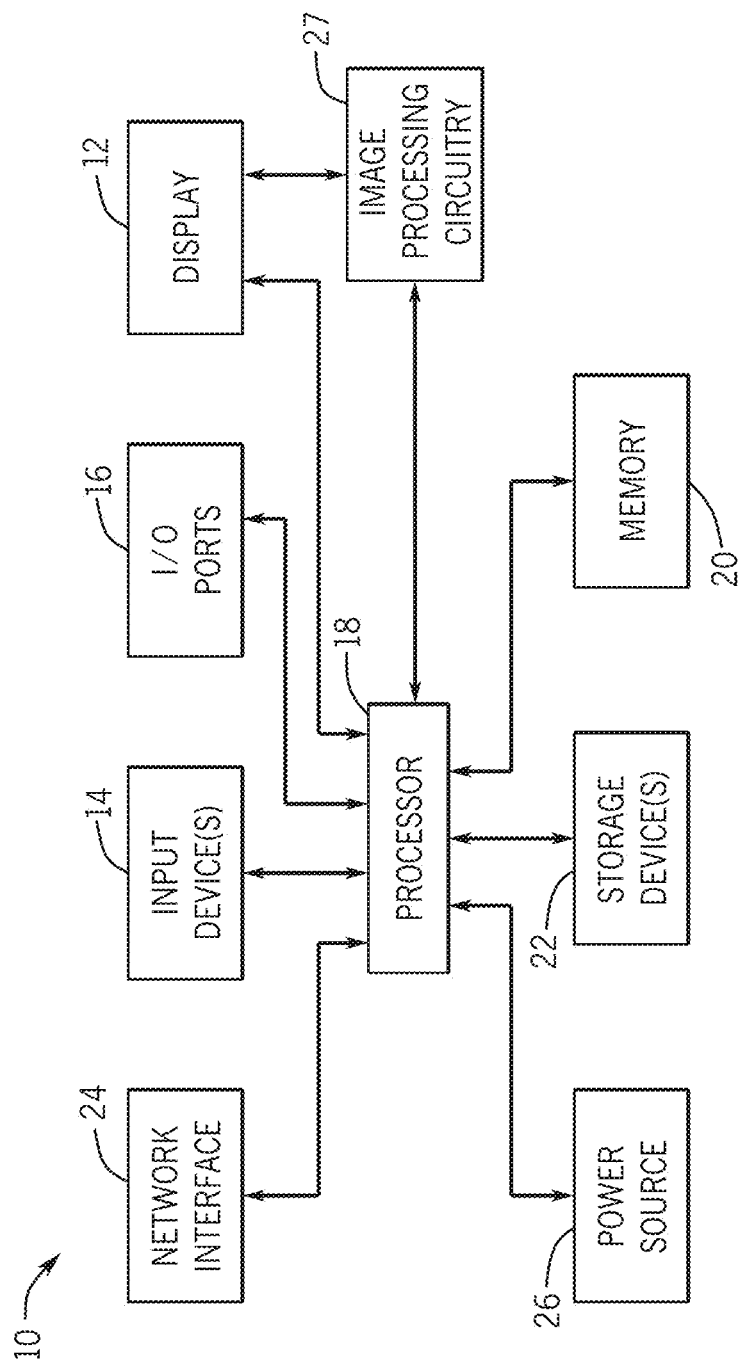
FIG. 1 is a block diagram of an electronic device used to display image frames, in accordance with an embodiment of the present disclosure.

To produce accurate images on an electronic display in various conditions, control signals to display pixels may be compensated based at least in part on one or more temperature measurements of the electronic display. Systems and methods described herein may reduce or eliminate effects of hysteresis from test signals used to determine temperature measurements of the display, thereby improving the compensation of control signals based on the one or more temperature measurements. To help illustrate, an electronic device 10 including an electronic display 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof.

In addition to executable instructions, the local memory 20 and/or the main memory storage device 22 may store data to be processed by the processor core complex 18. Thus, in some embodiments, the local memory 20 and/or the main storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the I/O ports 16. In some embodiments, the I/O ports 16 may enable the electronic device 10 to interface with other electronic devices. For example, a portable storage device may be connected to an I/O port 16, thereby enabling the processor core complex 18 to communicate data with the portable storage device.

As depicted, the electronic device 10 is also operably coupled with input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using light-emitting diodes (LED display), a self-emissive display, such as an organic light-emitting diode (OLED) display, or the like. Additionally, in some embodiments, the electronic display 12 may refresh display of an image and/or an image frame, for example, at 60 Hz (corresponding to refreshing 60 frames per second), 120 Hz (corresponding to refreshing 120 frames per second), and/or 240 Hz (corresponding to refreshing 240 frames per second).

As depicted, the electronic display 12 is operably coupled to the processor core complex 18 and the image processing circuitry 27. In this manner, the electronic display 12 may display image frames based at least in part on image data generated by the processor core complex 18 and/or the image processing circuitry 27. Additionally or alternatively, the electronic display 12 may display image frames based at least in part on image data received via the network interface 24 and/or the I/O ports 16.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 extend through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 4:
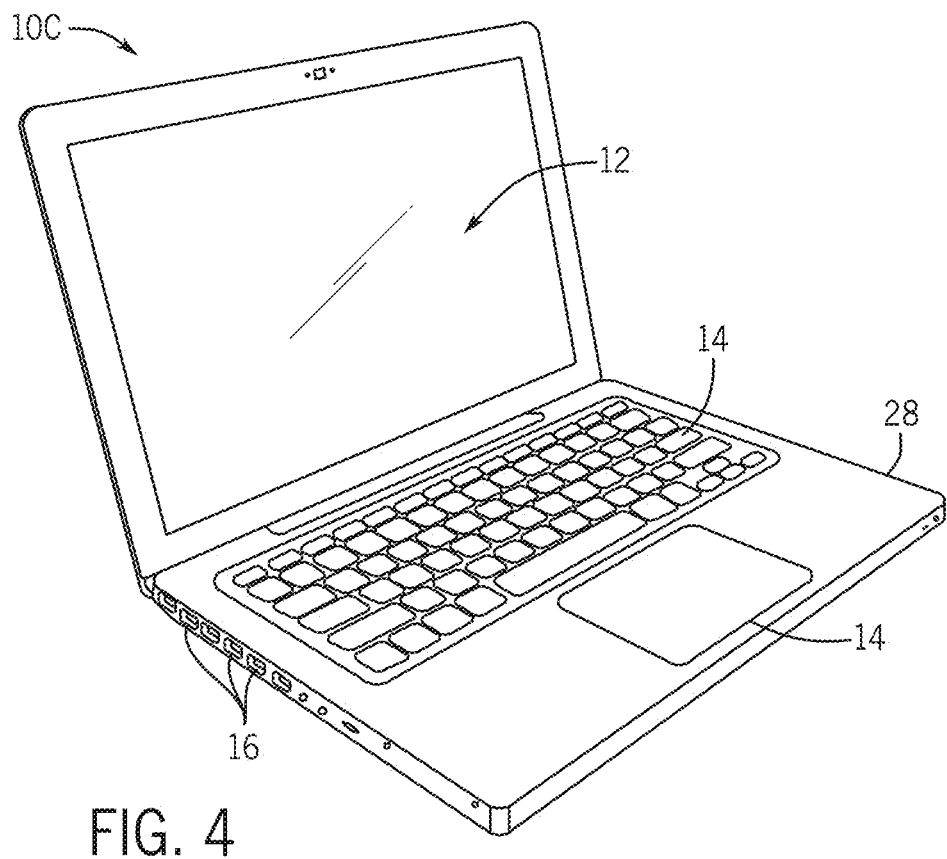
FIG. 4 is another example of the electronic device of FIG. 1, in accordance with an embodiment of the present disclosure.
Figure 5:
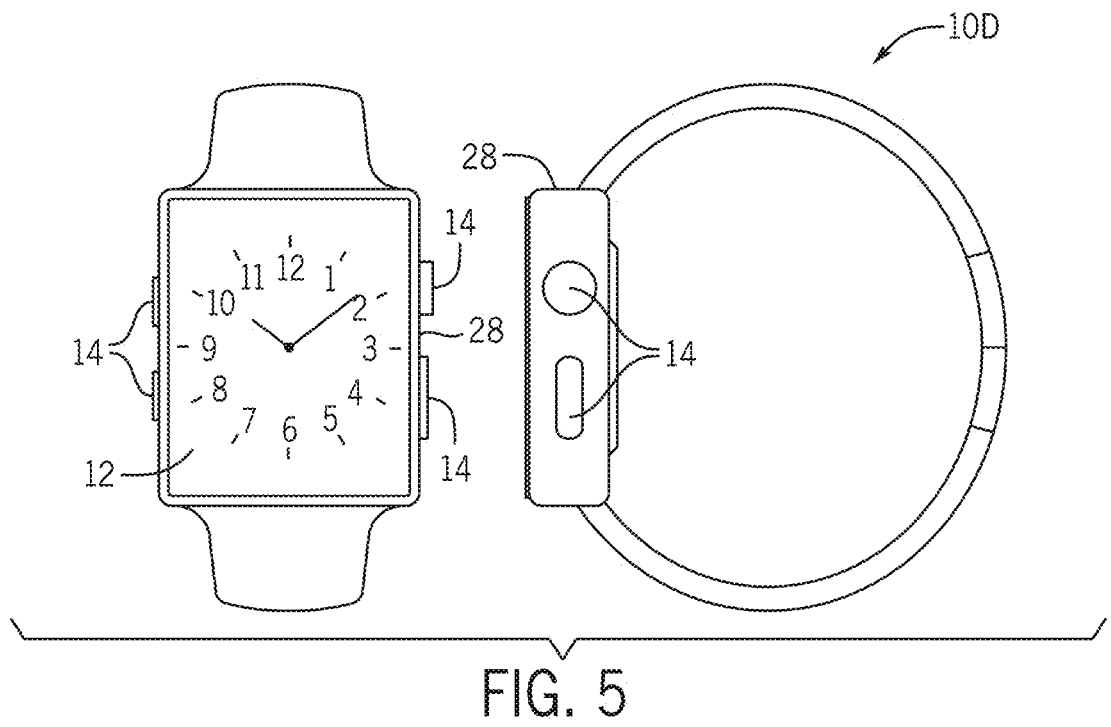
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, and an enclosure 28.

Figure 6:
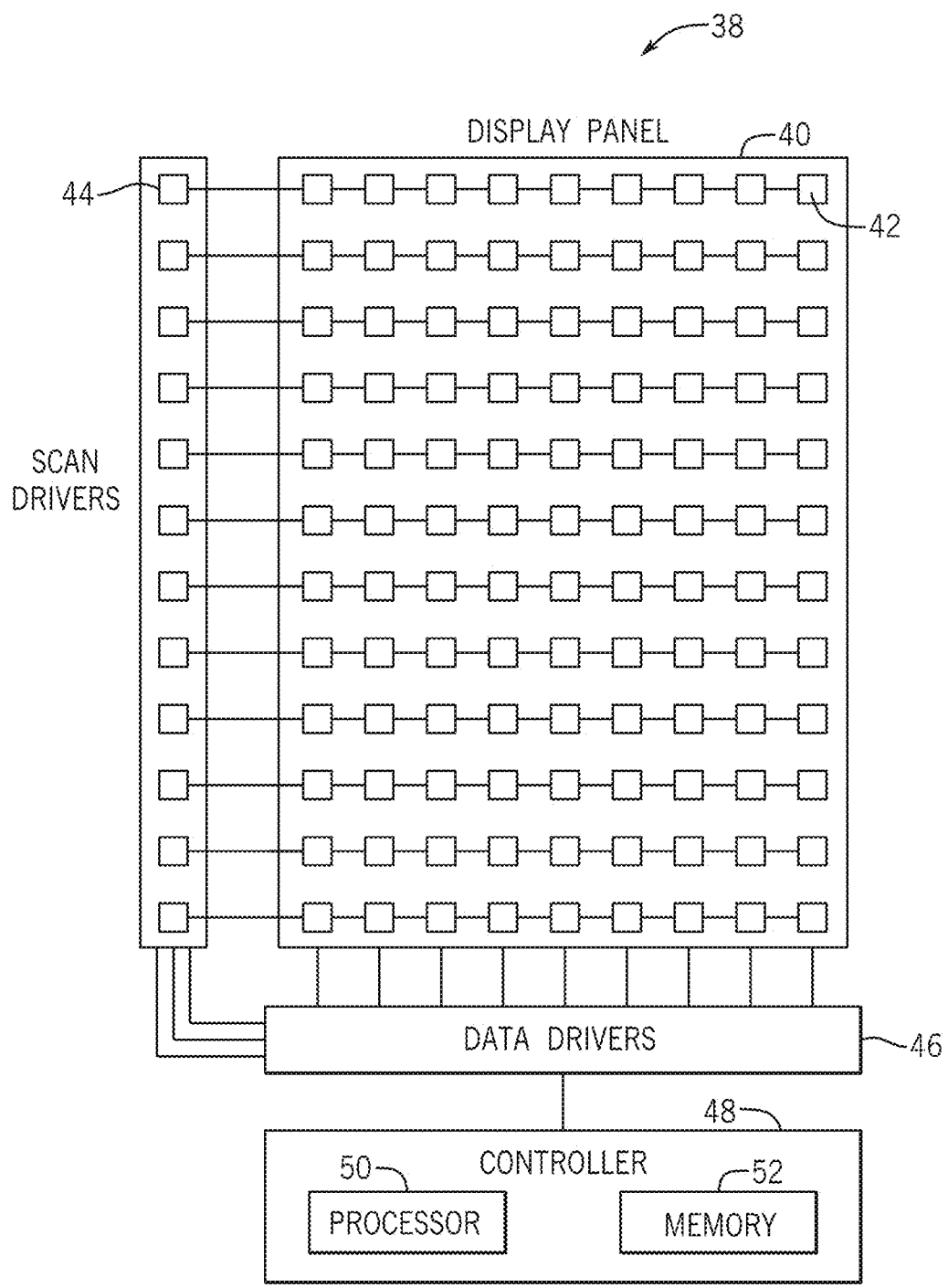
FIG. 6 is a high-level schematic diagram of display driver circuitry of the electronic display of FIG. 1, in accordance with an embodiment of the present disclosure.

With the foregoing in mind, a schematic diagram of display driver circuitry 38 of the electronic display 12 is shown in FIG. 6. The display driver circuitry 38 may include circuitry, such as one or more integrated circuits, state machines made of discrete logic and other components, and the like, that provide an interface function between, for example, the processor 18 and/or the image processing circuitry 27 and the electronic display 12. As depicted, the display driver circuitry 38 includes a display panel 40 with multiple display pixels 42 arranged in rows and columns. A set of scan drivers 44 and a set of data drivers 46 are communicatively coupled to the display pixels 42. As illustrated, one scan driver 44 is communicatively coupled to each row of display pixels 42, and one data driver 46 is communicatively coupled to each column of display pixels 42. A scan driver 44 may supply one or more scan signals or control signals (e.g., voltage signals) to a display pixel row to control operation (e.g., programming, writing, and/or emission period) of the row. The scan drivers 44 may be daisy chained together, such that a single control signal may be sent to the set of scan drivers 44 to display an image frame. Timing of the control signal may be controlled by propagation of the control signal through the set of scan drivers 44. A data driver 46 may supply one or more data signals (e.g., voltage signals) to a display pixel column to program (e.g., write) one or more display pixel in the column. In some embodiments, electrical energy may be stored in a storage component (e.g., capacitor) of a display pixel to control magnitude of current (e.g., via one or more programmable current sources) to facilitate controlling light emission from the display pixel. It should be noted that any suitable arrangement of communicatively coupling scan drivers 44 and data drivers 46 to the display pixels 42 is contemplated (e.g., communicatively coupling one or more scan drivers 44 and/or one or more data drivers 46 to one or more display pixels 42).

As depicted, a controller 48 is communicatively coupled to the data drivers 46. The controller 48 may instruct the data drivers 46 to provide one or more data signals to the display pixels 42. The controller 48 may also instruct the scan drivers 44 to provide one or more control signals to the display pixels 42 (via the data drivers 46). While the controller 48 is shown as part of the display panel 40, it should be understood that the controller 48 may be external to the display panel 40. Moreover, the controller 48 may be communicatively coupled to the scan drivers 44 and the data drivers 46 in any suitable arrangement (e.g., directly coupling to the scan drivers 44, directly coupling to the scan drivers 44 and the data drivers 46, and the like). The controller 48 may include one or more processors 50 and one or more memory devices 52. In some embodiments, the processor(s) 50 may execute instructions stored in the memory device(s) 52. Thus, in some embodiments, the processor(s) 50 may be included in the processor core complex 18, the image processing circuitry 27, a timing controller (TCON) in the electronic display 12, and/or a separate processing module. Additionally, in some embodiments, the memory device(s) 52 may be included in the local memory 20, the main memory storage device 22, and/or one or more separate tangible, non-transitory, computer-readable media.

The controller 48 may control the display panel 40 to display an image frame at a first or target luminance or brightness. For example, the controller 48 may receive image data from an image data source that indicates the target luminance of one or more display pixels 42 for displaying an image frame. The controller 48 may display the image frame by controlling (e.g., by using a switching element) magnitude and/or duration (e.g., an emission period) current is supplied to light-emission components (e.g., an OLED) to facilitate achieving the target luminance.

That is, the controller 48 may display the image frame for a target emission period, which may be a ratio or percentage of a display period of the image frame. For example, if the target luminance of the image frame is 60% of a maximum luminance available of the electronic display, the controller 48 may switch on the display pixels to emit light for a ratio or percentage (e.g., 60%) of a display period of the image frame that results in displaying the image frame at the target luminance. The controller 48 may switch off light emitting devices of the display pixels to stop emitting light for the remainder (e.g., 40%) of the display period. In this manner, the controller 48 may instruct the display panel 40 to display the image frame at the target luminance. In some embodiments, the controller 48 may also control magnitude of the current supplied to enable light emission to control luminance of the image frame.

Figure 7:
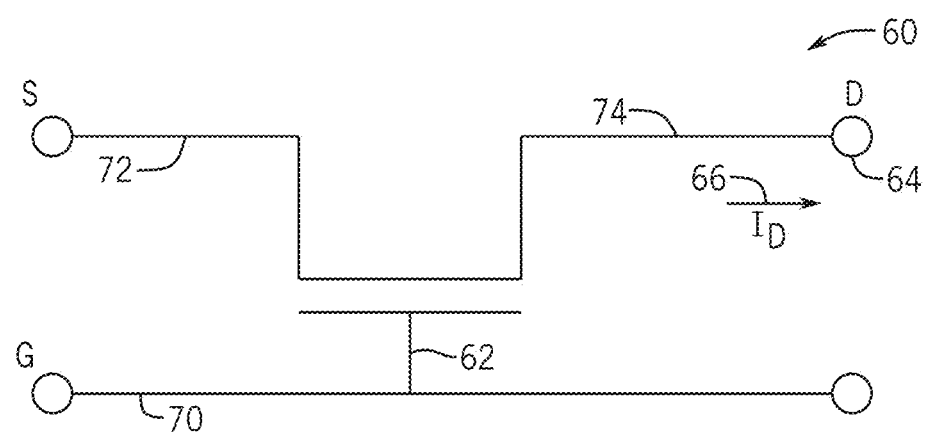
FIG. 7 is an embodiment of a component that receives an applied voltage and produces an output based at least in part on the applied voltage.

It may be appreciated that each display pixel 42 of the display panel 40 may have one or more components (e.g., transistors, diodes). FIG. 7 illustrates an embodiment of a component 60 that receives an applied voltage and produces an output voltage or output current. For example, a voltage ($V_{GS}$) applied to a gate 62 of the component 60 may set the component in a conducting state, and produce a current ($I_D$) 66 at a drain 64 of the component 60. As discussed herein, $V_{GS}$ is a gate-to-source voltage applied to the gate 62 of the component 60. In some embodiments, the component 60 may be in a non-conducting state unless or until a voltage greater than a threshold voltage ($V_{TH}$) is applied to the gate 62. The threshold voltage ($V_{TH}$) of the component 60 may be based at least in part on a structure of the component 60 (e.g., thickness, shape, type), materials of the component 60 (e.g., substrate material, dopant material, dopant quantity), temperature of the component 60, or any combination thereof. It may be appreciated that while the component 60 of FIG. 7 only illustrates the gate 62, the drain 64, and a source 68, some embodiments of components 60 may have other inputs and outputs. Additionally, multiple components 60 may be coupled together such that more than one component 60 is coupled to a gate line 70, a source line 72, or a drain line 74, or any combination thereof.

The voltage ($V_{GS}$) applied to the gate 62 of the component 60 affects the current ($I_D$) 66 produced at the drain 64 of the respective component 60. The relationship between the voltage ($V_{GS}$) and the current ($I_D$) 66 may vary based at least in part on the type of component (e.g., transistor, diode), the materials of the component (e.g., low-temperature polysilicon (LTPS), metal-oxide), the threshold voltage ($V_{TH}$), or any combination thereof. Additionally, the relationship between the voltage ($V_{GS}$) and the current ($I_D$) 66 of the component 60 is related to a temperature of the component 60. Accordingly, when the $V_{GS}$ applied to the component 60, the resulting current $I_D$ from the component 60, and the relationship between $V_{GS}$ and $I_D$ (or between $V_{GS}$ and a mapped function of $I_D$ as described below) for the component 60 are known, the temperature of the component 60 may be determined, such as via an equation or a look-up table.

Figure 8:
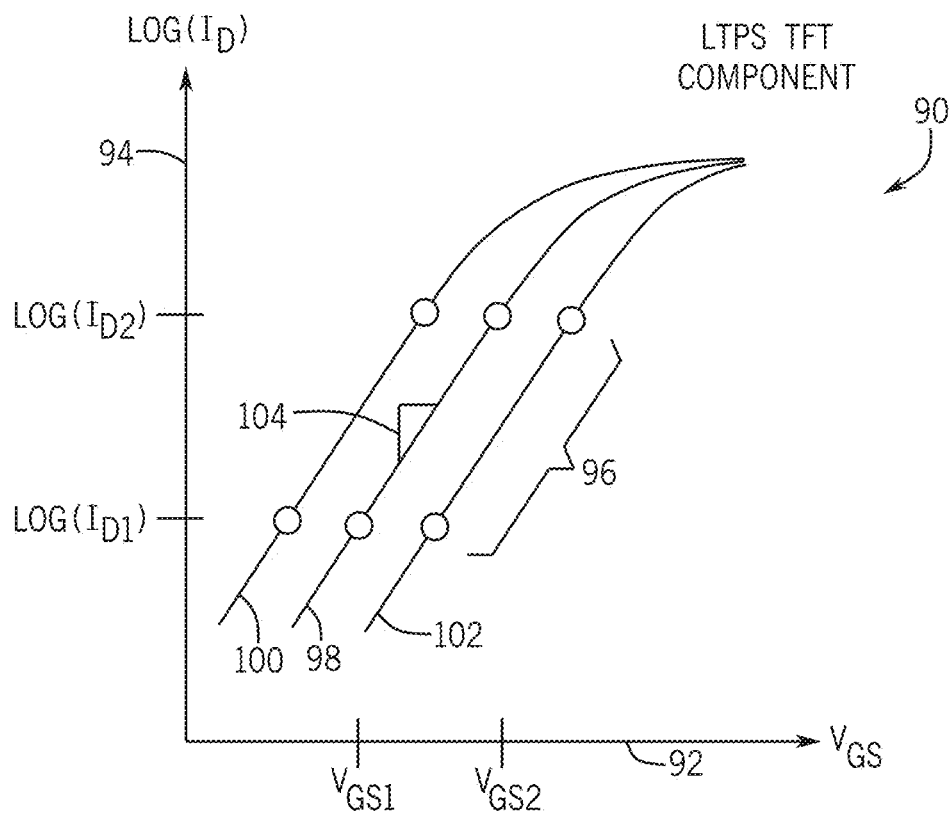
FIG. 8 is an embodiment of a chart depicting a relationship between an applied gate voltage and functionally mapped output current for a low-temperature polysilicon (LTPS) thin-film transistor (TFT) component.

FIG. 8 illustrates an embodiment of a chart 90 depicting a relationship between $V_{GS}$ and $I_D$ for a component 60 that is an LTPS TFT component. It may be appreciated that for an LTPS TFT component 60, the current $I_D$ is exponentially related to the applied voltage $V_{GS}$. Through taking the logarithm of the current $I_D$ (e.g., $\log(I_D)$), at least a portion of the chart 90 exhibits a linear region 96 that may be readily utilized for analysis as described below. The chart 90 illustrates this relationship between the applied voltage $V_{GS}$ on the x-axis 92 and the logarithm of the current $I_D$ on the y-axis 94. A first curve 98 illustrates the linear region 96 for applied voltages $V_{GS1}$ and $V_{GS2}$. It may be appreciated that the applied voltages $V_{GS1}$ and $V_{GS2}$ may be applied to the component 60 at a first operating state of the component, and the corresponding outputs $\log(I_{D1})$ and $\log(I_{D2})$ are measured outputs during the first operating state.

However, the same voltages $V_{GS1}$ and $V_{GS2}$ applied to the same component 60 during previous or subsequent operating states may produce different corresponding outputs, as shown by the second curve 100 and third curve 102. For example, the second curve 100 may illustrate the relationship between the applied voltage $V_{GS}$ and the logarithm of the current $I_D$ at a second operating state of the LTPS TFT component 60 prior to the first operating state, and the third curve 102 may illustrate the relationship between the applied voltage $V_{GS}$ and the logarithm of the current $I_D$ at a third operating state of the LTPS TFT component 60 subsequent to the first operating state. The second and third curves 100, 102 illustrate the effect of hysteresis on the measurements of the current $I_D$, despite that component is at the same temperature in the first, second, and third operating states. It may be appreciated that hysteresis is the dependence of the state of a system on its history. The hysteresis effect on the current $I_D$ measurements may cause determinations of the temperature based on the current $I_D$ measurements to also be affected by hysteresis, thereby reducing the accuracy of the determined temperature. However, it is believed that for the LTPS TFT component 60 operating at a temperature T, a slope 104 of the linear region 96 for each of the curves 98, 100, 102 is the same. That is, the slope 104 is believed to be largely independent of hysteresis. Moreover, the temperature of the LTPS TFT component 60 may be proportional to the slope 104 of the linear region 96 of the component 60. In particular the slope 104 of the linear region 96 may be related to the temperature T of the LTPS TFT component 60 as shown by the following equation:

$$\text{Slope} \propto \frac{T}{\left(1 - \left(\frac{\Delta V_H}{\Delta V_{GS}}\right)\right)} \quad \text{Equation 1}$$

where T is the absolute temperature of the component 60, $\Delta V_H$ is a change of voltage measurements due to hysteresis, and $\Delta V_{GS}$ is the change in the applied voltage (e.g., $V_{GS2}$-$V_{GS1}$). When the time between the change of the applied voltage $V_{GS}$ is less than approximately 15, 10, 8, or 5 ms, the $\Delta V_H$ value approximates zero such that the slope in the linear region 96 is proportional to the absolute temperature T of the LTPS TFT component 60. Additionally, or in the alternative, when the measurements of the current $I_D$ and $V_{GS}$ for the LTPS TFT component 60 occur during the time span of one display frame of the display panel 40, then the $\Delta V_H$ value approximates zero or is substantially smaller than $\Delta V_{GS}$ such that the slope is proportional to the temperature T of the component 60. For example, if 1% temperature accuracy is desired, then a $\Delta V_H$ value less than 1% of $\Delta V_{GS}$ is sufficient. Accordingly, the temperature T of an LTPS TFT component 60 may be determined from the slope 104 of a curve plotting the applied voltage $V_{GS}$ and a logarithm of the measured output current $I_D$ because the slope 104 is proportional to the temperature T. Thus, for an LTPS TFT component 60, a logarithmic mapping function applied to the measured output current $I_D$ facilitates the determination of the temperature of the LTPS TFT component 60. This temperature of the LTPS TFT component 60 may be substantially independent of hysteresis of the measured output current $I_D$. As discussed herein, the phrase "substantially independent of hysteresis" is defined such that any error of the temperature of the LTPS TFT component 60 due to hysteresis after the application of the compensation voltage derived from the temperature measurements does not result in a visual artifact that is perceptible to an unaided human eye.

Figure 9:
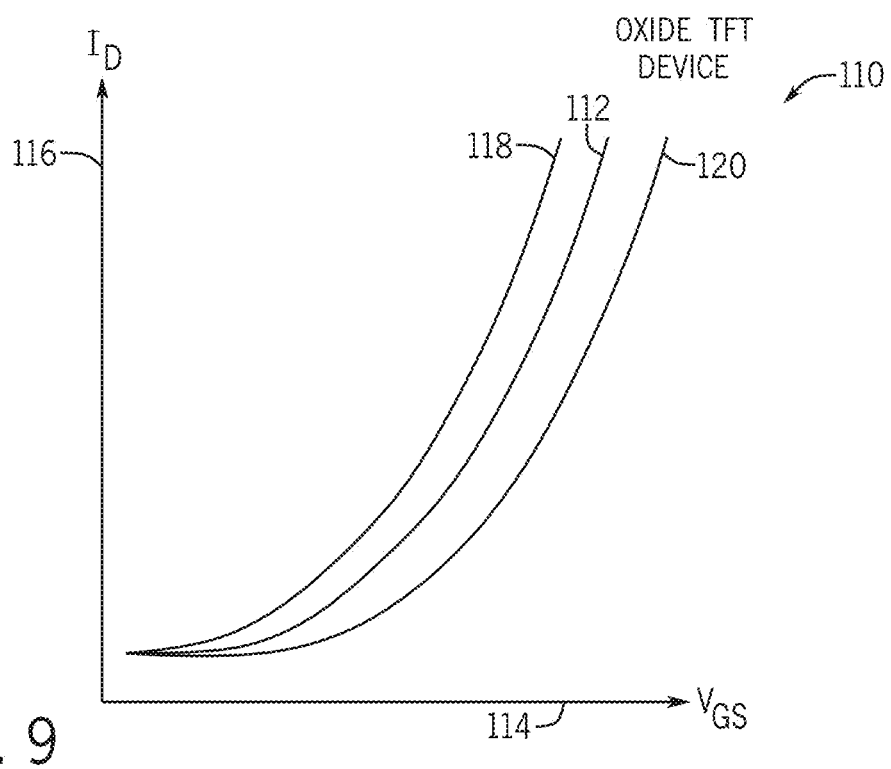
FIG. 9 is an embodiment of a chart depicting a relationship between an applied gate voltage and output current for an oxide TFT component.

FIG. 9 illustrates an embodiment of a chart 110 depicting relationship between $V_{GS}$ and $I_D$ for a component 60 that is an oxide TFT component 60. It may be appreciated that for an oxide TFT component 60, the current $I_D$ is related to the applied voltage $V_{GS}$ by a power-law function. For example, the relationship between the current $I_D$ and the applied voltage $V_{GS}$ of an oxide TFT component 60 may be shown by the following equation:

$$I_D = V_{GS}^{\gamma_0} \quad \text{Equation 2}$$

where $\gamma_0$ may be determined by the following equation:

$$\gamma_0 = 2\left(\frac{T_0}{T}\right) \quad \text{Equation 3}$$

with $T_0$ being a reference temperature and T being an absolute temperature of the oxide TFT component 60. Accordingly, the value $\gamma_0$ is inversely proportional to the temperature of the oxide TFT component 60. Therefore, determination of the value $\gamma_0$ enables the determination of the temperature of the oxide TFT component 60. A first curve 112 illustrates the power-law relationship between the applied voltage VGS 114 and the current ID 116 in a first operating state.

In a similar manner as discussed above with the LTPS TFT component 60 of FIG. 8, the operation of the same oxide TFT component 60 during previous or subsequent operating states may produce different corresponding outputs, as shown by a second curve 118 and a third curve 120. For example, the second curve 118 may illustrate the relationship between the applied voltage $V_{GS}$ and the current $I_D$ at a second operating state of the oxide TFT component 60 prior to the first operating state, and the third curve 120 may illustrate the relationship between the applied voltage $V_{GS}$ and the current $I_D$ at a third operating state of the oxide TFT component 60 subsequent to the first operating state. The second and third curves 118, 120 illustrate the effect of hysteresis on the measurements of the current $I_D$, despite that the oxide TFT component 60 is at the same temperature in the first, second, and third operating states. The hysteresis effect on the current $I_D$ measurements may cause determinations of the temperature based on the current $I_D$ measurements to also be affected by hysteresis, thereby reducing the accuracy of the determined temperature. Because the shape of the curve 112, 118, and 120 appears to be approximately the same at a temperature T for various operating states that exhibit hysteresis, it is believed that determination of the value $\gamma_0$ for the curve 112 as described below may reduce or eliminate hysteresis from temperature measurements of the oxide TFT component 60.

Figure 10:
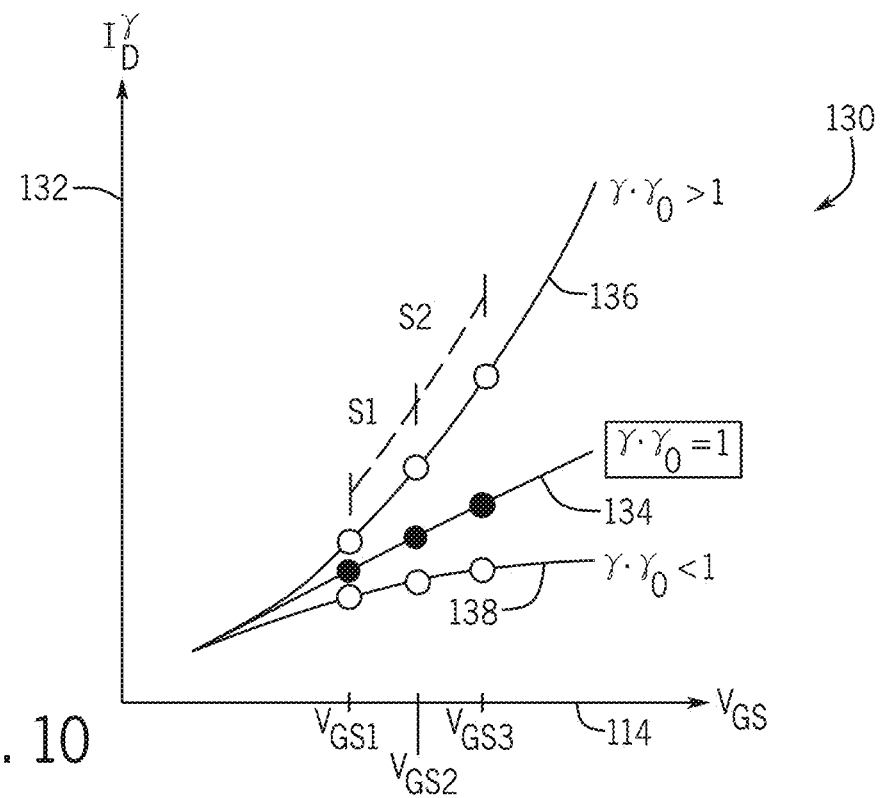
FIG. 10 is an embodiment of a chart depicting a relationship between an applied gate voltage and functionally mapped output current for an oxide TFT component.

To determine the value $\gamma_0$, a power rule mapping function may be applied to three or more current measurements $I_D$. It may be appreciated that an inverse $\gamma$ of the value $\gamma_0$ may be estimated computationally with three or more corresponding measurements of $V_{GS}$ and $I_D$, as described with FIG. 10. Chart 130 illustrates an embodiment of iterations of a power rule mapping function applied to a set of current $I_D$ measurements corresponding to the applied voltage $V_{GS}$ 114. The y-axis 132 of the chart 130 depicts the current $I_D$ adapted by the power rule mapping function, which raises the current $I_D$ measurements to the $\gamma$ power. Where three or more mapped current values $I_D$ for corresponding applied voltages (e.g., $V_{GS1}$, $V_{GS2}$, $V_{GS3}$) have a linear correlation, as shown by the middle curve 134, the value $\gamma$ of the power rule mapping function is the inverse of the value $\gamma_0$. That is, the absolute temperature T of the oxide TFT component 60 may be determined from that value $\gamma$ from the power rule mapping function. Accordingly, the linearization of the current values $I_D$ with respect to the applied voltage $V_{GS}$ may enable the temperature T of the oxide TFT component 60 to be determined with a reduced effect of hysteresis.

However, where three or more mapped current values $I_D$ do not have a linear correlation, the value $\gamma$ of the power rule mapping function may be determined to be greater than or less than the inverse of the value $\gamma_0$. For example, where the curve through the mapped current values $I_D$ is concave up, as shown by the top curve 136, then the value $\gamma$ of the power rule mapping function may be determined to be greater than the inverse of the value $\gamma_0$. Where the curve through the mapped current values $I_D$ is concave down, as shown by the bottom curve 138, then the value $\gamma$ of the power rule mapping function may be determined to be less than the inverse of the value $\gamma_0$. It may be appreciated that upon determination that the value $\gamma$ of the power rule mapping function is not determined to be within a threshold (1% or less) of the inverse of the value $\gamma_0$, the value $\gamma$ of the mapping function may be iteratively adjusted (e.g., tuned) to determine a better estimation of the value $\gamma$.

As discussed above each component (e.g., transistor, diode) may have a respective relationship between the applied voltage, output current, and temperature that may be determined through application of a mapping function to the output current. In some embodiments, the applied voltage and measured output current values used to determine the temperature of the respective components may be determined while the controller simultaneously controls the electronic display with control signals and/or data signals for a display frame of the electronic display. That is, a test signal (e.g., applied voltage value) for a component may be inserted prior to a control signal for a display frame, or inserted after a control signal for a display frame. Additionally, or in the alternative, the test signal (e.g., applied voltage value) for a component may be applied in a separate test frame, which may be brief and imperceptible to a human operator of the electronic device. In some embodiments, the test signal is applied periodically during operation of the electronic display, upon reset or startup of the electronic display, or during every frame of the electronic display. As discussed herein, application of a test signal to a component may include the application of 2, 3, 4, 6, 10, or more gate voltages ($V_{GS}$) and the determination of the corresponding output currents ($I_D$) during a brief time span (e.g., less than 20, 15, 10, 8, or 5 ms). As discussed above, the change of voltage measurements due to hysteresis ($\Delta V_H$) may be reduced or eliminated when the gate voltages ($V_{GS}$) are applied near one another in time, such as within less than approximately 15, 10, 8, or 5 ms of a prior gate voltage of the test signal.

Figure 11:
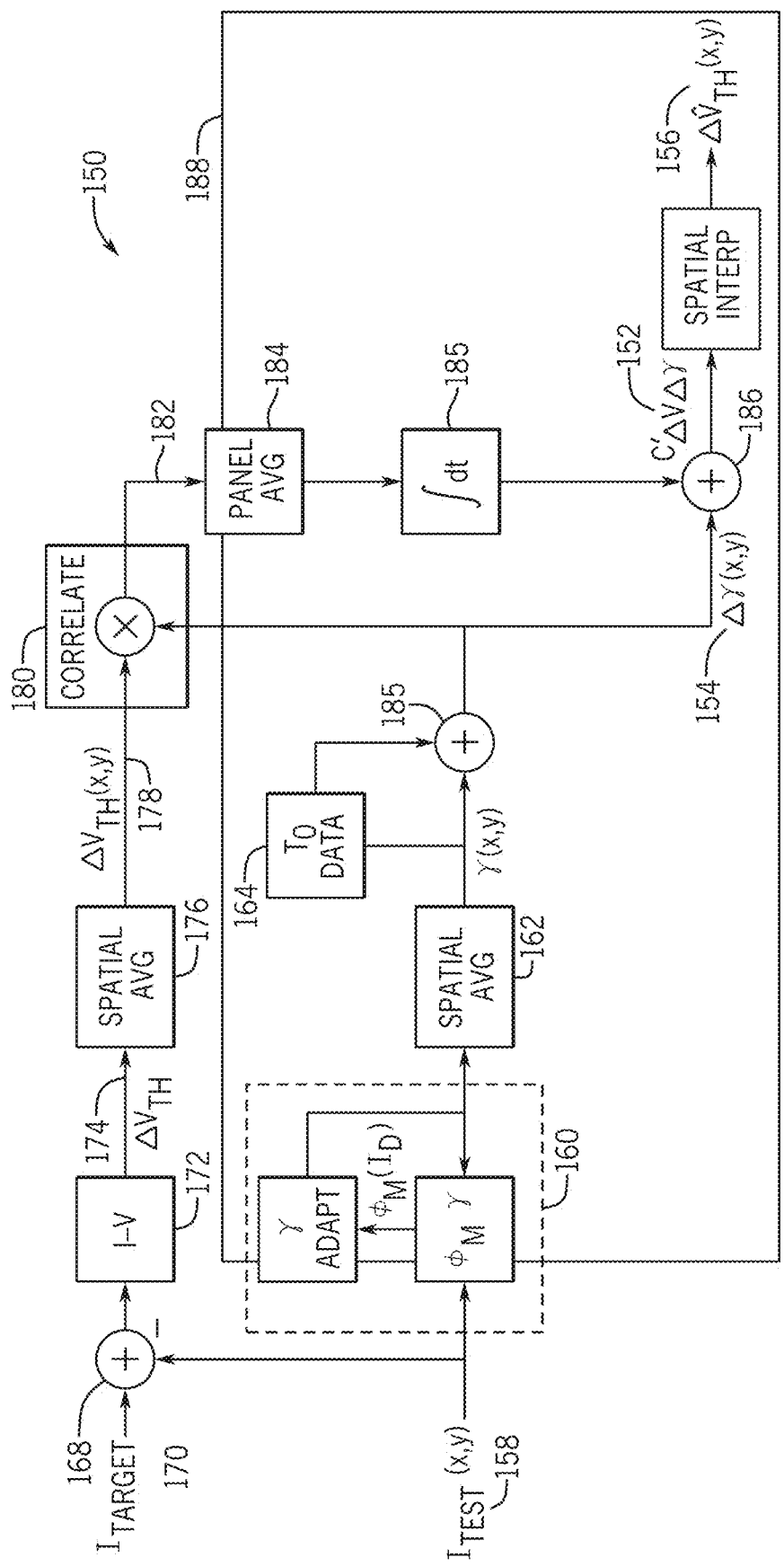
FIG. 11 is an embodiment of a process for determining a temperature map for components of a display and compensating control signals to the components based at least in part on the temperature of the components.

FIG. 11 illustrates an embodiment of a process 150 for determining a threshold shift compensation coefficient 152 and a temperature map 154 that is substantially free of hysteresis. That is, the temperature map 154 may be substantially independent of hysteresis such that any error of the temperature map 154 due to hysteresis after the application of the compensation voltage derived from the temperature measurements does not result in a visual artifact that is perceptible to an unaided human eye. With the threshold shift compensation coefficient 152 and the temperature map 154 across the display panel 40, the controller 48 may appropriately compensate the control signals 156 to the component to reduce or eliminate temperature effects on the display of a target image on the display panel 40 of the electronic display 12. The controller 48 of the display panel 40 or another processor of the electronic device 10 may execute instructions for the process 150.

Results 158 (e.g., applied gate voltages $V_{GS}$ and corresponding output currents $I_D$) from an applied test signal for one or more components are provided to a mapping function block 160. The results 158 may include $V_{GS}$ and $I_D$ data sets (e.g., curves) from all or a subset of components across the display panel 40. The mapping function block 160 determines an intermediate value (e.g., $\gamma$) related to the temperature of each respective component 60. In some embodiments and for some types of components 60, application of the mapping function may enable the direct determination of the intermediate value for the component. In other embodiments, the mapping function may be applied to the results to iteratively determine (e.g., tune) the intermediate value. The mapping function block 160 enables the determination of the intermediate value, which is substantially independent of hysteresis of the results 158 (e.g., output currents $I_D$). That is, the intermediate value may be substantially independent of hysteresis such that any error of the intermediate value due to hysteresis after the application of the mapping function block 160 does not result in a visual artifact that is perceptible to an unaided human eye. For example, as described above with FIG. 8, a logarithmic mapping function applied to the output current for an LTPS TFT component may facilitate determination of an intermediate value (e.g., slope) that is proportional to temperature of the LTPS TFT component. Additionally, as described above with FIGS. 9 and 10, a power rule mapping function applied to the output current for an oxide TFT component may facilitate determination of an intermediate value (e.g., $\gamma_O$) that is inversely proportional to the temperature of the oxide TFT component. In some embodiments, the intermediate value (e.g., slope, $\gamma_O$) is determined through an iterative process, as described above with the oxide TFT component. In some embodiments, a generic nonlinear mapping function ($\Phi_M$) applied to the output current for a component may be defined by the following equation:

$$\Phi_M(I_D) = a\ln\left(1 + \frac{V_{GS}}{a}\right) \qquad \text{Equation 4}$$

where $\alpha$ is a tuned intermediate value related to the temperature of the component.

The controller utilizes the mapping function block 160 to produce an intermediate value for each component represented by the results 158. In some embodiments, intermediate values related to temperature measurements correspond to each respective component across a display panel 40. In some embodiments, the intermediate values correspond to only a subset of the respective components across the display panel 40, such as a subset of 50, 30, 25, 20, 10, 5, or 1 percent of the components of the display panel 40. Where only the intermediate values correspond to a subset of the respective components across the display panel 40, each intermediate value may be representative of the temperature of a region of the display panel 40 that surrounds the respective component. Additionally, or in the alternative, the intermediate values in a region of the display panel may be consolidated (block 162) to a spatially averaged intermediate value for the region. For example, an electronic display with full HD resolution may enable the determination of intermediate values for each component in a 1920×1080 array across the display panel 40; however, the display panel 40 may be subdivided into regions, such as a 16×9 array, where each region includes multiple components. In some embodiments, the regions of the display panel 40 are distributed non-uniformly across the display panel 40. The controller 48 compares (node 166) the intermediate values for each component 60 or for each region with temperature reference data 164 (e.g., To) to determine a temperature map 154 across the display panel 40.

The controller 48 compares (node 168) the results 158 from the applied test signal for one or more components to a target output current 170 for a display frame to be displayed on the display panel 40, and converts (block 172) the comparison result to a voltage threshold shift 174 ($\Delta V_{TH}$) for each component. However, this determined voltage threshold shift 174 is not free of hysteresis, and is an estimate of a threshold shift of the component 60 relative to a reference state of the component 60, such as during fabrication of the display panel 40. This threshold shift 174 for each component may be aggregated and spatially averaged (block 176) for regions of the display panel 40, in a similar manner as discussed above with block 162 for the intermediate value. Accordingly, an array 178 of threshold shifts is determined for components or regions across the display panel 40.

As discussed above, the voltage threshold shift ($V_{TH}$) for a component 60 may be related to the temperature of the component, the structure of the component, the materials of the component, or any combination thereof. The controller 48 correlates (block 180) the temperature map 154 with the array of threshold shifts to determine a correlation 182 for each region or component 60. This correlation 182 for each region or component 60 across the display panel 40 may be averaged at block 184 and integrated (block 185) over two or more image frames to determine the threshold shift compensation coefficient 152. In some embodiments, the output of the block 184 may be integrated (block 185) over 2, 3, 4, 5, 6, 7, 8, 9, 10, or more image frames. This integration of the panel averaged correlation enables an array of compensated control signals 156 to converge to the threshold shift compensation coefficient 152, thereby reducing or eliminating any average correlation present for the components 60 of the display panel 40. That is, the modification of the compensated control signals 156 over two or more image frames may cause the temperature-correlated components of the threshold shift array 178 to approach zero on average across the display panel 40, thereby effectively removing the temperature-correlated component of the threshold shift array 178. Moreover, because the threshold shift compensation coefficient 152 is averaged over the display panel 40 rather than determined from just one component or a smaller region of the display panel 40, hysteresis of the threshold shift correlation 182 is suppressed. The controller 48 may cross-multiply (node 186) the threshold shift compensation coefficient 152 with the temperature map 154 (array) to determine an array of compensated control signals 156 that reduce or eliminate temperature effects on the display of a target image on the display panel 40. It may be appreciated that the processes and values illustrated in block 188 of FIG. 11 are substantially independent of effects of hysteresis on the results 158 from the applied test signal.

Figure 12:
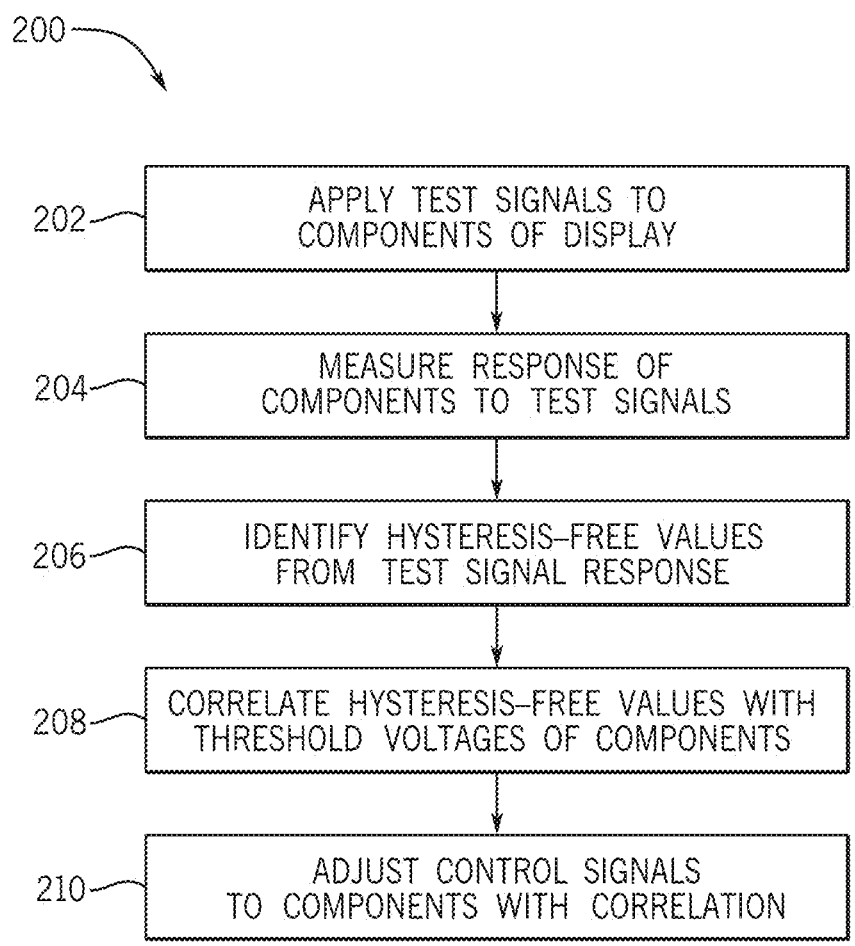
FIG. 12 is an embodiment of a flowchart for adjusting image data to compensate for temperature.

FIG. 12 is an embodiment of a flowchart 200 that may be executed by the controller 48 to adjust control signals (i.e., image data) to compensate for the temperature of components of the display panel 40. The controller 48 applies (block 202) test signals to components 60 of the display panel 40. For example, the controller 48 may apply gate voltages $V_{GS}$ to each component 60 of the display panel 40, or to a subset of components 60 across the display panel 40. The controller 48 measures (block 204) the response of each tested component. For example, the controller 48 may measure an output current $I_D$ from each component in response to the applied gate voltage $V_{GS}$. The controller 48 identifies (block 206) hysteresis free values from the measured response and applied test signals. As discussed in detail above, these hysteresis-free values may be identified through the application of a mapping function to the measured response, through a graphical processing (e.g., slope identification, curve fitting) of a plot of the measured response and the test signals, or any combination thereof. In some embodiments, the controller 48 correlates (block 208) the identified hysteresis-free values with other characteristics of the components 60. These other characteristics of the components 60, such as threshold voltages, may be affected by hysteresis. However, through this correlation of block 208, the controller 48 may identify a compensation coefficient that is largely free of hysteresis. Accordingly, the controller 48 may adjust (block 210) control signals to the components 60 based at least in part on the correlation to compensate the control signals for the components 60 of the display panel 40.

Figure 13:
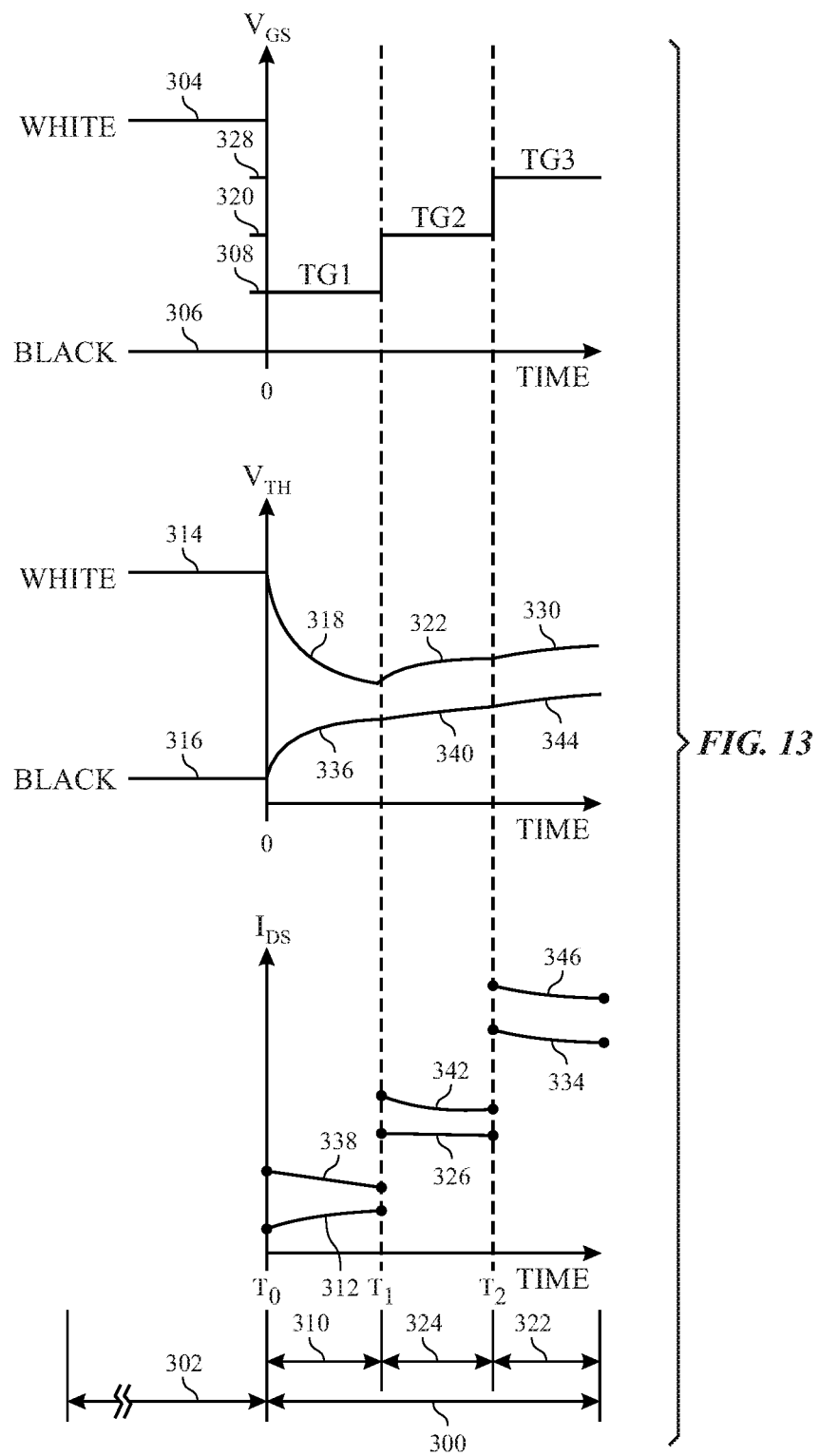
FIG. 13 is an embodiment of charts illustrating applied gate voltage, and sensed currents applied to the TFT component during a prior frame and a test frame.

As noted above with the discussion of FIG. 10, one or more test signals may be applied to components 60 of the display panel 40 between control signals for display frames on the display panel 40. For example, one or more test gray voltages $V_{GS}$ may be applied to components 60 of the display panel 40 during test frames that occur between display frames of the display panel. FIG. 13 illustrates charts depicting voltages ($V_{GS}$ and $V_{TH}$) and sensed current (IDS) related to a component 60 of the display panel 40 during a test frame 300. The test frame 300 may be brief and imperceptible to a human operator of the electronic device. For example, the test frame 300 may be less than 20, 17, 16, 15, 10, 8, or 5 ms. As discussed herein, the gate-to-source voltages ($V_{GS}$) applied to the component 60 during the test frame 300 are referred to as test gray (TG) voltages. Although FIG. 13 illustrates three base TG voltages TG1, TG2, and TG3, it may be appreciated that some embodiments may utilize 1, 2, 3, or more base TG voltages during the test frame 300.

FIG. 13 illustrates two examples of the $V_{GS}$ applied to the component in a prior frame 302 that immediately precedes the test frame 300: a white $V_{GS}$ 304 and a black $V_{GS}$ 306. The white $V_{GS}$ 304 example may correspond to the maximum $V_{GS}$ applied to the component 60 during the prior frame 302, such as when the portion of the image to be displayed by the component 60 is white. The black $V_{GS}$ 306 example may correspond to the minimum $V_{GS}$ applied to the component 60 during the prior frame 302, such as when the portion of the image to be displayed by the component 60 is black (e.g., no image displayed by the component 60). During the prior frame 302, the component $V_{GS}$ applied to the component 60 may cause the component to produce an output (e.g., light) with a brightness and color. Thus, the prior frame 302 may be an image frame in which a human operator may observe the output produced by the component 60. During the test frame 300, the $V_{GS}$ applied to the component 60 may be configured to not produce an output that is observable by a user. For example, the output of the component 60 during the test frame 300 may be sufficiently brief and/or sufficiently dim to reduce or eliminate perception by an unaided human operator.

White $V_{GS}$ Prior Frame Example:

At the beginning to of the test frame 300, the controller 48 may apply TG1 308 to the component 60 as the $V_{GS}$. At $t_0$, the $V_{TH}$ decreases from a white $V_{TH}$ 314 toward the $V_{TH}$ level determined by TG1 308, as shown by the first white $V_{TH}$ curve 318. During a first portion 310 of the test frame 300, a white first current 312 may be sensed on the component 60 in response to the $V_{GS}$ of TG1 308 applied to the component 60 after the white $V_{GS}$ 304 of the prior frame 302. At $t_1$ of the test frame 300, the controller 48 may apply TG2 320 to the component 60 as the $V_{GS}$. At $t_1$, the $V_{TH}$ increases toward the $V_{TH}$ level determined by TG2 320, as shown by the second white $V_{TH}$ curve 322. During a second portion 324 of the test frame 300, a white second current 326 may be sensed on the component 60 in response to the $V_{GS}$ of TG2 320 applied to the component 60 after the white $V_{GS}$ 304 and TG1 308. At $t_2$ of the test frame 300, the controller 48 may apply TG3 328 to the component 60 as the $V_{GS}$. At $T_2$, the $V_{TH}$ increases toward the $V_{TH}$ level determined by TG3 328, as shown by the third white $V_{TH}$ curve 330. During a third portion 332 of the test frame 300, a white third current 334 may be sensed on the component 60 in response to the $V_{GS}$ of TG3 328 applied to the component 60 after the white $V_{GS}$ 304, TG1 308, and TG2 320.

Black $V_{GS}$ Prior Frame Example:

At the beginning to of the test frame 300, the controller 48 may apply TG1 308 to the component 60 as the $V_{GS}$. At $t_0$, the $V_{TH}$ increases from a black $V_{TH}$ 316 toward the $V_{TH}$ level determined by TG1 308, as shown by the first black $V_{TH}$ curve 336. During the first portion 310 of the test frame 300, a black first current 338 may be sensed on the component 60 in response to the $V_{GS}$ of TG1 308 applied to the component 60 after the black $V_{GS}$ 306 of the prior frame 302. At $t_1$ of the test frame 300, the controller 48 may apply TG2 320 to the component 60 as the $V_{GS}$. At $t_1$, the $V_{TH}$ increases toward the $V_{TH}$ level determined by TG2 320, as shown by the second black $V_{TH}$ curve 340. During the second portion 324 of the test frame 300, a black second current 342 may be sensed on the component 60 in response to the $V_{GS}$ of TG2 320 applied to the component 60 after the black $V_{GS}$ 306 and TG1 308. At $t_2$ of the test frame 300, the controller 48 may apply TG3 328 to the component 60 as the $V_{GS}$. At $T_2$, the $V_{TH}$ increases toward the $V_{TH}$ level determined by TG3 328, as shown by the third black $V_{TH}$ curve 344. During the third portion 332 of the test frame 300, a black third current 346 may be sensed on the component 60 in response to the $V_{GS}$ of TG3 328 applied to the component 60 after the black $V_{GS}$ 306, TG1 308, and TG2 320.

The first white $V_{TH}$ curve 318 has a different shape and different values than the first black $V_{TH}$ curve 336 due at least in part to hysteresis from the $V_{GS}$ applied to the component 60 during the prior frame 302. Additionally, the first white current 312 has a different shape and different values than the black first current 338 due at least in part to hysteresis from the $V_{GS}$ applied to the component 60 during the prior frame 302. That is, hysteresis from the white $V_{GS}$ 304 and the black $V_{GS}$ 306 of the prior frame 302 affects the sensed current IDS of the component 60 during the test frame 300 despite application of the same $V_{GS}$ voltage to the component 60 during the test frame. Furthermore, it is noted that the white $V_{TH}$ curves 318, 322, 330 after the prior frame 302 with the white $V_{GS}$ 304 are generally greater than the black $V_{TH}$ curves 336, 340, 344 after the prior frame 302 with the black $V_{GS}$ 306. Moreover, it is noted that the white currents 312, 326, 334 after the prior frame 302 with the white $V_{GS}$ 304 are generally less than the black currents 338, 342, 346 after the prior frame 302 with the black $V_{GS}$ 306. Accordingly, the compensation to the $V_{GS}$ during the test frame 300 to obtain a consistent sensed current IDS may relate to the magnitude of the $V_{GS}$ applied to the component during the prior frame 302.

Figure 14:
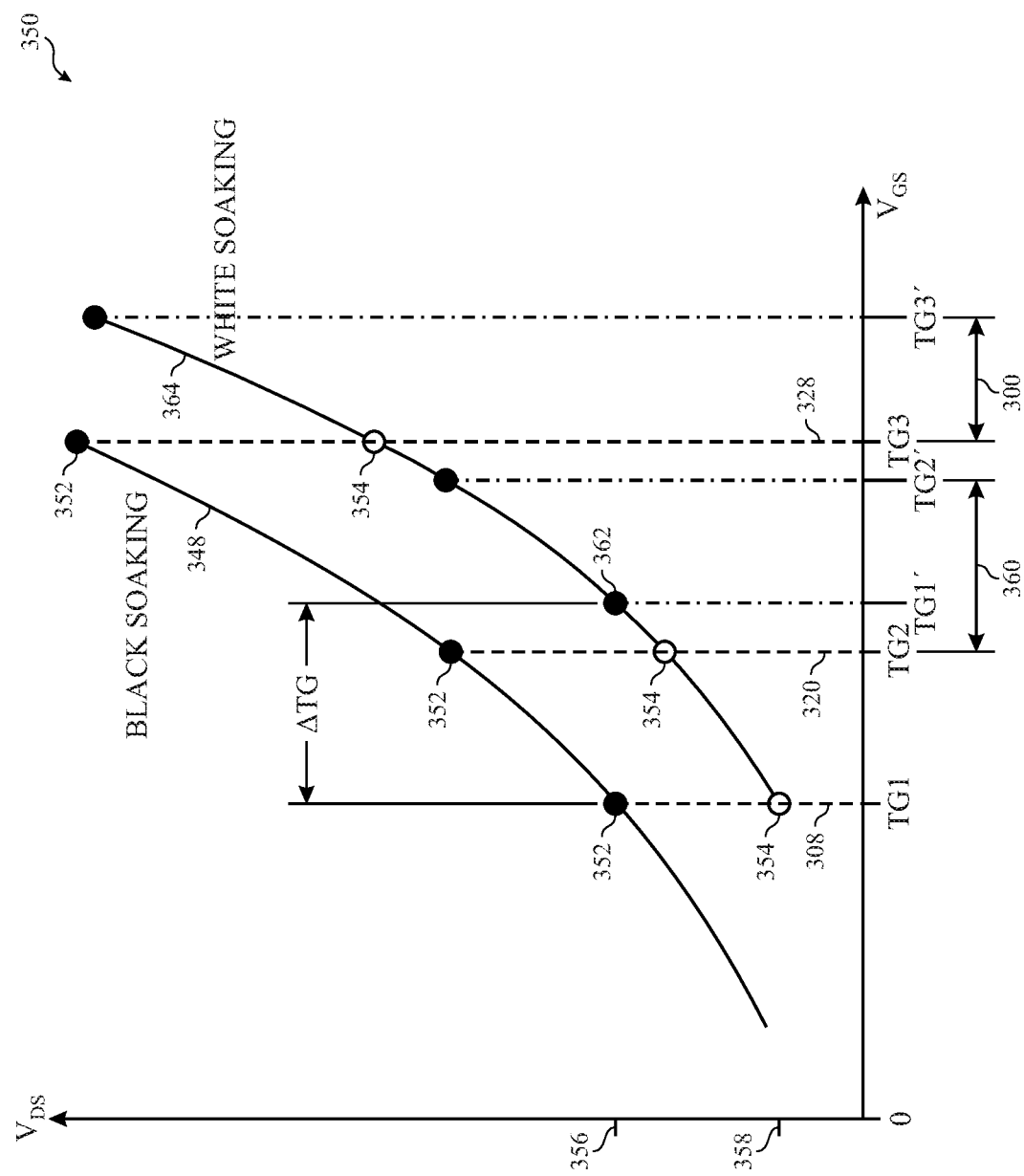
FIG. 14 is an embodiment of a chart illustrating different sensed currents from the TFT component in response to applied test gray (TG) voltages after different control signals in the prior frame.

FIG. 14 illustrates a graph 350 of sensed currents IDS of the component 60 in response to various $V_{GS}$ values applied to the component 60. The current IDS of the component 60 may be sensed at one or more times during the test frame 300. For example, sensed black soaking current values 352 of FIG. 14 may correspond to a sensed black current 348 at to when TG1 is applied to the component 60, at $t_1$ when TG2 is applied to the component 60, and at $t_3$ when TG3 is applied to the component 60. In a similar manner, white soaking current values 354 of FIG. 14 may correspond to a sensed white current 364 at time to when TG1 is applied to the component 60, at $t_1$ when TG2 is applied to the component 60, and at $t_3$ when TG3 is applied to the component 60. As illustrated with the sensed black current 348 and the sensed white current 364, the white soaking current values 354 that are sensed after a white $V_{GS}$ 304 in the prior frame 302 are less than the black soaking current values 352 sensed after a black $V_{GS}$ 306 in the prior frame 302, despite the application of the same $V_{GS}$ (e.g., TG1, TG2, TG3) during the test frame 300. That is, the sensed black soaking current value 352 at TG1 is a first value 356, and the sensed white soaking current value 354 at TG1 is a second value 358 that is less than the first value 356.

A curve connecting the sensed white soaking current values 354 illustrates that a different $V_{GS}$ value than TG1 may be applied to the component 60 to obtain a current $I_D$ with the first value 356. For example, applying an adjusted TG voltage TG1' to the component 60 after the white $V_{GS}$ 304 was applied in the prior frame 302 may cause a compensated current value 362 to be approximately the first value 356. The compensated current value 362 at TG1' may substantially match (e.g., within 10%) the sensed black soaking current value 352 at TG1. Accordingly, compensation of the TG voltage applied to the component 60 during the test frame 300 based on the $V_{GS}$ applied during the prior frame 302 may increase the accuracy and/or consistency of sensed current values IDS despite hysteresis from the $V_{GS}$ values applied to the component 60 during the prior frame 302.

The adjusted TG voltage TG1' may differ from base TG voltage TG1 by $\Delta TG$. In some embodiments, the same $\Delta TG$ value may be added to the other base TG voltages in the same test frame 300 to compensate for the lower sensed current after the white $V_{GS}$ 304 in the prior frame 302. As discussed in detail below, the $\Delta TG$ added to the TG values during the test frame 300 may be determined based on the $V_{GS}$ of the prior frame 302. For example, a first $\Delta TG$ may be used to compensate the $V_{GS}$ during the test frame 300 that occurs after prior frame 302 with a $V_{GS}$ (that is near $V_{GS-WHITE}$) to the component 60. A second $\Delta TG$ may be used to compensate the $V_{GS}$ during the test frame 300 that occurs after prior frame 302 with a $V_{GS}$ (that is near $V_{GS-BLACK}$) to the component 60. In this example, the first $\Delta TG$ is larger than the second $\Delta TG$, yet both the first $\Delta TG$ and the second $\Delta TG$ may cause the sensed current value at TG1' (e.g., TG1+$\Delta TG$) to be approximately the same. In some embodiments, a $\Delta TG$ value may be determined for each TG, such as shown by shifts 360. That is, the shift 360 to compensate the TG2 or the TG3 applied to the component 60 may be different than the $\Delta TG$ applied to TG1. Although the above description and FIG. 14 illustrates adjusting the $V_{GS}$ applied to the component 60 during the test frame 300 to enable the sensed current IDS from the component 60 to be approximately the same as the sensed current IDS after the black $V_{GS}$ 306 in the prior frame 302, it should be understood from the above description that the $V_{GS}$ applied to the component 60 during the test frame 300 may be adjusted to enable the sensed current IDS from the component 60 to be approximately the same as the sensed current IDS after the white $V_{GS}$ 304 or another $V_{GS}$ value in the prior frame 302. Moreover, the $\Delta TG$ may have a positive or negative value.

Figure 15:
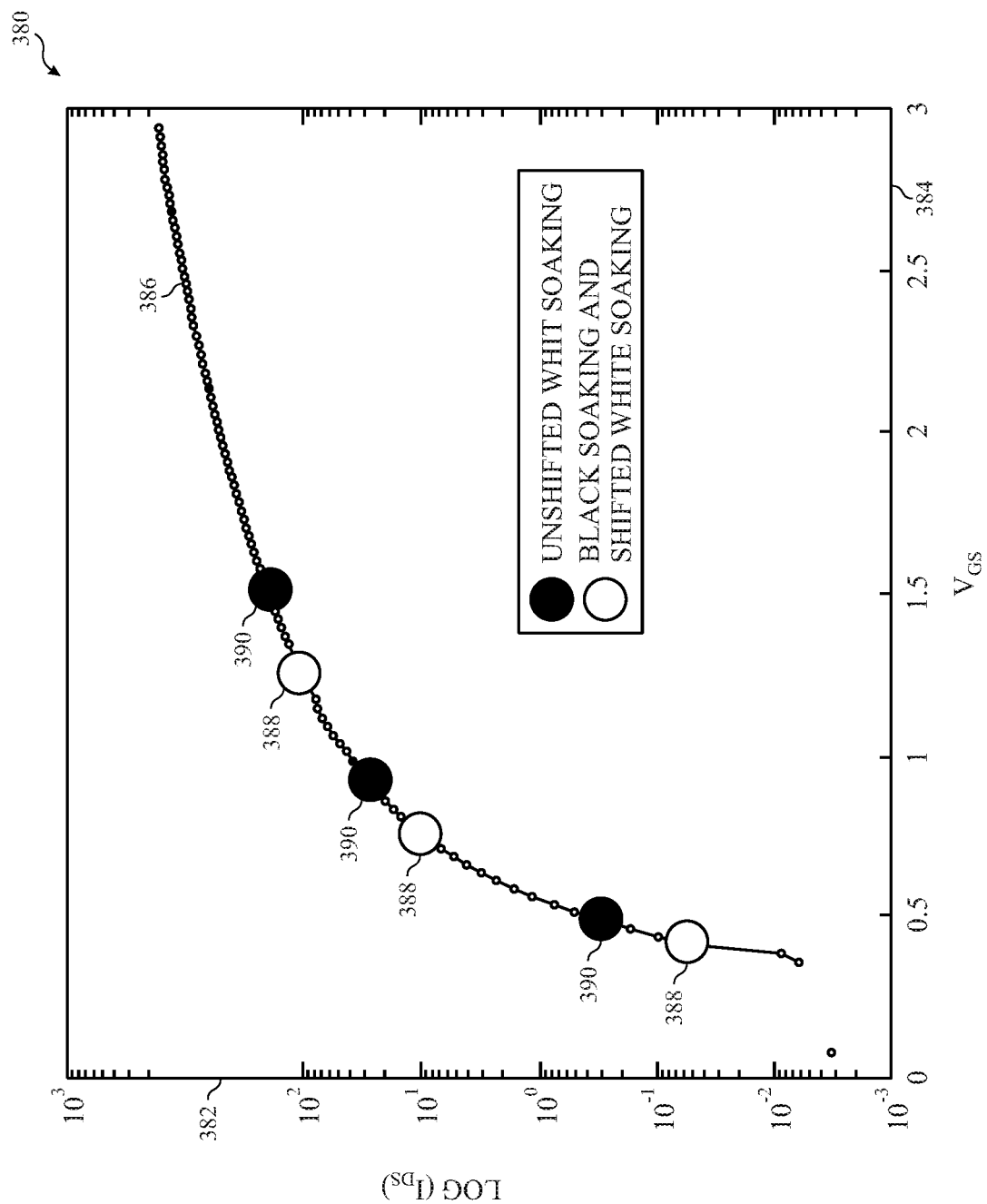
FIG. 15 is an embodiment illustrating sensed current values for voltages applied to the TFT component.

The sensed current values during the test frame 300 may be evaluated to determine parameters utilized to evaluate conditions of the display. For example, the $V_{GS}$ applied during the test frame 300 and the sensed current values from the test frame may be utilized to determine parameters, such as g, μ, and $V_{TH}$. These parameters may be utilized to determine conditions (e.g., temperature, aging) of the electronic device 10, to determine control signals for subsequent image frames, or any combination thereof. In some embodiments, a relationship between the current IDS of the TFT component 60 is related to $V_{GS}$ and the parameters g, μ, and $V_{TH}$ by the following Equation 5:

$$I_D = \mu (V_{GS} - V_{TH})^g \quad \text{Equation 5}$$

where g relates to a power factor, μ relates to a mobility factor, and $V_{TH}$ is a threshold voltage of the component 60 as discussed above. FIG. 15 illustrates an embodiment of a chart 380 where the Y-axis 382 is the log of the sensed current IDS, and the X-axis 384 is the $V_{GS}$ applied to the component 60. A curve 386 illustrates the relationship between the log of the sensed current IDS and the applied $V_{GS}$ for the component at a known state. As described above with FIGS. 8-12, multiple sensed current values may be used to determine conditions (e.g., temperature) of the electronic device, to determine control signals for subsequent image frames, or any combination thereof. Sensed current values 388 plotted on the curve 386 correspond to $V_{GS}$ values (e.g., TG1, TG2, TG3) in the test frame 300 after the white $V_{GS}$ value 304 in the prior frame 302. The black sensed current values 390 plotted on the curve 386 correspond to $V_{GS}$ values (e.g., TG1, TG2, TG3) in the test frame 300 after the black $V_{GS}$ value 306 in the prior frame 302. Evaluation of the sensed current values 388, such as with Equation 5, would result in different extracted parameters g, μ, and $V_{TH}$ than the same evaluation with the black sensed current values 390. This is due to the fact that Equation 5 is an approximation of the I-V characteristics of a TFT component. A fixed set of three parameters (g, μ and $V_{TH}$) cannot accurately capture the whole operation region of different current levels. The parameters extracted from the region covered by the values 390 may be different from the parameters evaluated from the region covered by the values 388. While the difference between the parameters extracted from different current levels may be small, the small difference may still translate into large temperature error because one or more of the parameters may have small temperature sensitivity. Therefore, having the evaluated current level well aligned despite the content of the prior frame can mitigate such error. As described herein, the $V_{GS}$ values (e.g., TG1, TG2, TG3) applied during the test frame 300 may be compensated based on the $V_{GS}$ value in the prior frame 302 to enable the sensed current values that correspond to shifted $V_{GS}$ values to approximate the sensed current values 390. Accordingly, compensation of the $V_{GS}$ values applied during the test frame 300 may increase the consistency of the sensed current values regardless of the $V_{GS}$ value of the prior frame 302. Furthermore, increased consistency of the sensed current values enables consistent extraction of the parameters g, μ, and $V_{TH}$ for an electronic device 10 at a given state, thereby enabling increased temperature accuracy determination of the component 60, improved color output from the component 60, improved brightness output from the component 60, or any combination thereof.

Figure 16:
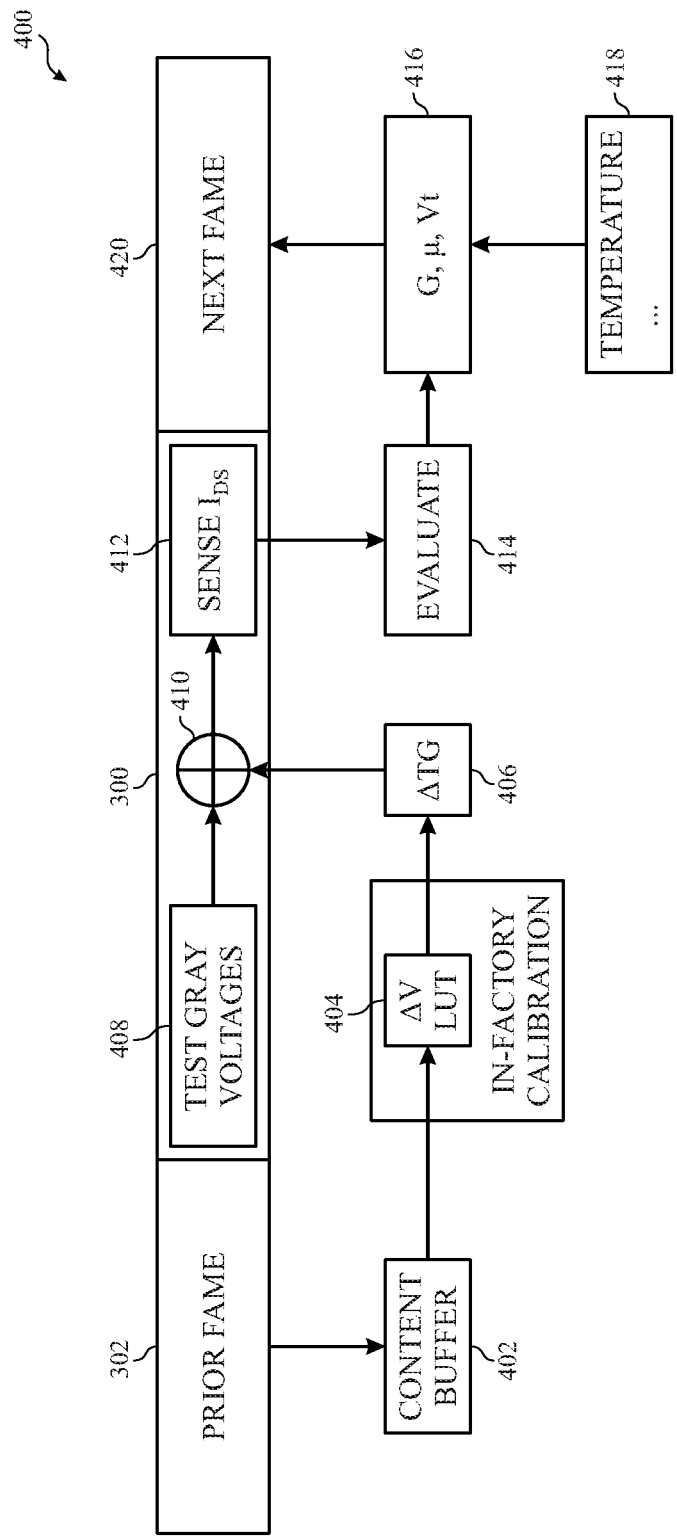
FIG. 16 is an embodiment of a process for determining a voltage shift to apply to TG voltages during a test frame period between image frames of the TFT component.

Having illustrated and described how hysteresis from the $V_{GS}$ applied to the components during the prior frame 302 may affect the sensed current values during a test frame 300, FIG. 16 illustrates an embodiment of a process 400 for determining a shift ΔTG to apply to test gray voltages (TG) applied to a component during the test frame to align the sensed current level. In the prior frame 302, the controller 48 of the display panel 40 may apply control signals (e.g., $V_{GS\text{-}0}$) to one or more components 60 of the display panel 40. In some embodiments, the applied control signals cause the one or more components 60 (e.g., OLED) to generate a light output of a desired color and brightness. At least a portion of the control signal applied to the one or more components 60 during the prior frame 302 may be stored in a content buffer 402. In some embodiments, the content buffer 402 is an array that includes the $V_{GS}$ applied to multiple components of the display panel 40. As discussed above, the display panel 40 may have multiple regions across all or part of the display panel 40, such as thermal measurement regions. In some embodiments, the resolution of pixels (e.g., OLEDs) across the display panel 40 is the same or is finer than the resolution of the thermal measurement regions across the display panel 40. The content buffer 402 may store the $V_{GS}$ applied to one or more components of each region.

The $V_{GS}$ values of the content buffer 402 and a lookup table 404 may be used to determine the shift ΔTG 406 to apply to test gray voltages 408 (e.g., TG) during the test frame 300. The lookup table 404 may be stored in a memory 52 of the controller 48 based on a calibration of the display panel 40, such as at the factory during manufacture of the display panel 40. The controller 48 may interpolate with the lookup table 404 and the data of the content buffer 402 to determine the appropriate shift ΔTG 406 based on the prior frame. That is, where the $V_{GS}$ in the content buffer 402 for a component in the prior frame 302 is between TG1 and TG2, the controller 48 may utilize the lookup table 404 with interpolation to determine the shift ΔTG 406 that is between an first appropriate shift ΔTG 406 for TG1 and a second appropriate shift ΔTG 406 for TG2. The shift ΔTG 406 may be an array with the same resolution as the content buffer 402.

During the test frame 300, the controller 48 may sum 410 the array of shifts ΔTG 406 to the respective base test gray voltages 408 for each of the regions across the display panel 40. The controller 48 applies the summed base test gray voltages 408 and the respective shifts ΔTG 406 to the respective components 60 in each region across the display panel 40, and receives sensed current outputs 412 from respective components 60. For example, during the test frame 300 and in each region across the display panel 40, the controller 48 may apply the sum TG1+ΔTG and receive $I_{DS1}$, the controller 48 may apply the sum TG2+ΔTG and receive $I_{DS2}$, and the controller 48 may apply the sum TG3+ΔTG and receive $I_{DS3}$. The sum of the shift ΔTG 406 and the base test gray voltage 408 is configured to compensate for variations in the $V_{GS}$ in the content buffer 402, thereby enabling the sensed current outputs 412 to be more consistent regardless of the $V_{GS}$ in the prior frame 302.

The controller 48 may evaluate 414 the sensed current outputs 412 (e.g., $I_{DS1}$, $I_{DS2}$, $I_{DS3}$) from the test frame 300 to extract parameters 416, such as g, μ, and $V_{TH}$ for each of the regions across the display panel 40. From these parameters 416, the controller 48 may determine conditions 418 of the regions of the display panel 40. These conditions 418 may include, but are not limited to, the temperature and/or aging of the regions of the display panel 40. Moreover, the controller 48 may utilize the parameters 416 to determine the control signals (e.g., $V_{GS}$) to apply to the components 60 across the display panel 40 to produce a desired image in a next frame 420 that immediately follows the test frame. The control signals applied to the components 60 in the next frame 420 may be based at least in part on the sensed current outputs 412 and image data for the next frame 420. In some embodiments, the control signals applied to the components 60 in the next frame 420 are based at least in part on the parameters 416 and/or the conditions 418 of the regions of the display panel 40, as well as image data for the next frame 420. In some embodiments, one or more of the parameters 416 may be utilized together to determine an intermediate value, such as γ described above. For example, the quotient of g and μ may be utilized to determine an intermediate value related to the temperature. This intermediate value may be utilized with the sensed currents to determine the temperature of the component.

As discussed above, the controller 48 utilizes the lookup table 404 with the content buffer 402 to determine the appropriate shift ΔTG 406 for each TG during the test frame.

Figure 17:
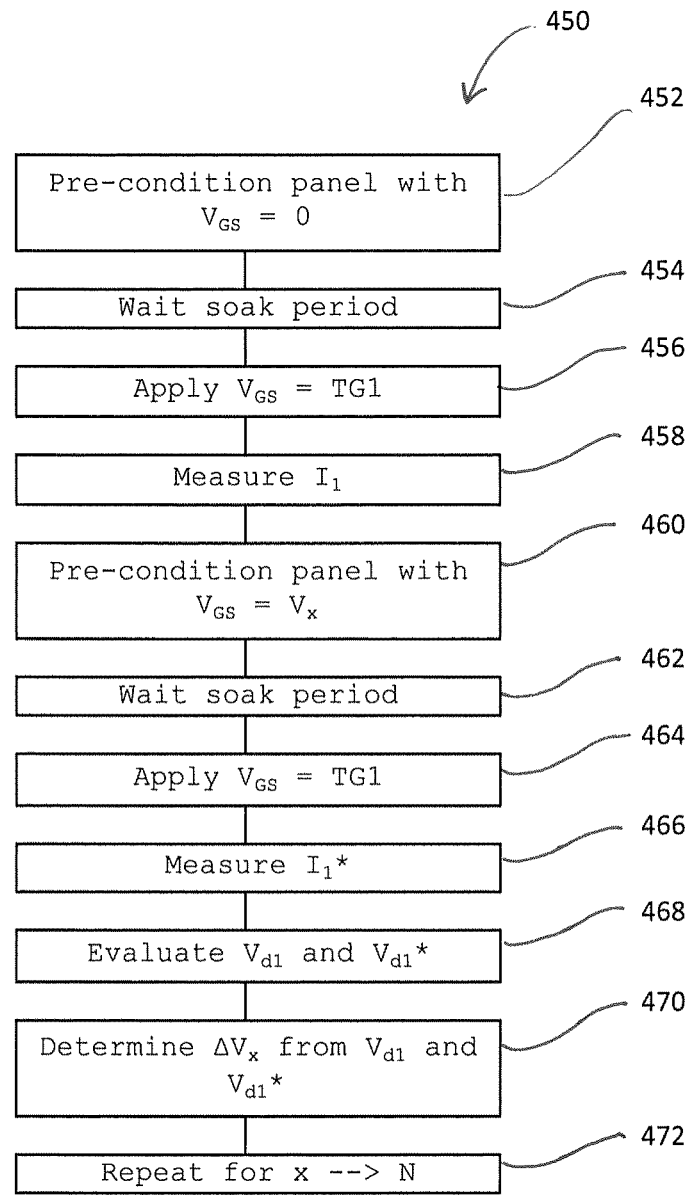
FIG. 17 is an embodiment of a process for determining values of a lookup table for the TFT components of the electronic device.

FIG. 17 illustrates a method 450 for determining the values of the lookup table 404. In some embodiments, the method 450 may be performed by the controller 48 of the display panel 40 or another controller during a calibration of the display panel 40, such as at the factory during manufacture of the display panel 40. The controller 48 pre-conditions (block 452) the display panel with $V_{GS}=0$, then waits (block 454) a soak period. The soak period may be configured to enable the subsequent measurement to include hysteresis effects from the pre-conditioned $V_{GS}$ value. The soak period may be 5, 8, 10, 15, 16, 17, 20, 50, 100, 500, or 1000 ms or more. Upon completion of the duration of the soak period, the controller 48 applies (block 456) TG1 to the components of the display panel as the $V_{GS}$, and measures (block 458) the output currents $I_1$ for the components of the display panel after the soak period at $V_{GS}=0$.

The controller 48 preconditions (block 460) the display panel with $V_{GS}=V_x$, then waits (block 462) the soak period. $V_x$ may be any permissible voltage for the one or more components that is greater than 0. As discussed below, at least block 460-470 may be repeated for multiple values of $V_x$, based at least in part on the array size of the lookup table 404. For example, the lookup table 404 may have four sets of values for ΔTG (e.g., $ΔTG_0$ for $VG_0=0$; $ΔTG_1$ for $VG_1=$ (⅓) $V_{WHITE}$; $ΔTG_2$ for $VG_2=$(⅔) $V_{WHITE}$; $ΔTG_3$ for $VG_3=V_{WHITE}$). After the soak period, the controller 48 applies (block 464) TG1 to the components of the display panel as the $V_{GS}$, and measures (block 466) the output currents $I_1^*$ for the components of the display panel after the soak period at $VG=V_x$.

The controller 48 evaluates (block 468) the output currents $I_1$ and $I_1^*$ with calibration parameters (e.g., $g_0$, $μ_0$, $V_{TH\,0}$) to determine voltages $V_{d1}$ and $V_{d1}^*$, respectively. From these determined voltages $V_{d1}$ and $V_{d1}^*$, the controller 48 determines (block 470) $ΔV_x$ as the difference between $V_{d1}$ and $V_{d1}^*$. This $ΔV_x$ may be stored in the memory 52 of the controller 48 and/or the display panel 40 as an entry in the lookup table 404. The controller 48 may be configured to determine $ΔV_x$ for multiple components 60 across the display panel 40 at substantially the same time. That is, in some embodiments the controller 48 calibrates the components 60 of the display panel 40 together, rather than separately. In some embodiments, the controller 48 may repeat (block 472) some or all of the blocks 452-470 to determine N values of $ΔV_x$ for the lookup table. In some embodiments, the controller 48 may repeat only blocks 460-470 without repeating blocks 452-458. The resulting lookup table 404 may be an array of three or more sets of values for ΔTG for each region across the display panel 40.

Accordingly, embodiments of the system and methods described above may utilize the output from components (e.g., transistors, diodes) to determine substantially hysteresis-free temperature measurements across a display panel. These hysteresis-free temperature measurements may be utilized to compensate subsequent control signals to the components for temperature-related effects on the component, such as a shift in the threshold voltage. Through compensation of the control signals to the components for temperature, the accuracy and/or consistency of images displayed on the display panel via the components may be improved.

Moreover, embodiments of the system and methods described above may improve the accuracy and/or consistency of the determination of parameters based on a test frame through compensation of TG values during the test frame based on the $V_{GS}$ values applied during the prior frame. Adjustment of the TG values used during the test frame may reduce or eliminate the extraction error of sensed current values due to hysteresis effects from the $V_{GS}$ of the prior frame. Reduction or elimination of the extraction error of sensed current values during the test frame may improve the accuracy of the determination of parameters utilized to adjust the control signals applied to components in one or more subsequent frames, thereby reducing or eliminating the difference between a desired color output and an actual color output of the component, reducing or eliminating the difference between a desired brightness output and an actual brightness output of the component, or any combination thereof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for operating an electronic display, comprising:
    applying a first gate-to-source voltage ($V_{GS}$) to a component of the electronic display during a prior frame;
    determining a test gray voltage shift (ΔTG) based on the first $V_{GS}$ of the prior frame;
    applying an adjusted test gray (TG) voltage to the component during a test frame, wherein the test frame is imperceptible on the electronic display, wherein the adjusted TG voltage comprises a sum of the ΔTG and a base TG voltage, and the adjusted TG voltage is configured to compensate for variations in the first $V_{GS}$ during the prior frame;
    sensing, during the test frame, a first current of the component in response to the adjusted TG voltage;
    applying a second adjusted TG voltage to the component during the test frame, wherein the second TG voltage comprises a second sum of the ΔTG and a second base TG voltage; and
    sensing, during the test frame, a second current of the component in response to the second adjusted TG voltage.

2. The method of claim 1, comprising determining a temperature of the component based at least in part on the sensed first current and the sensed second current during the test frame.

3. The method of claim 1, comprising: determining a second $V_{GS}$ to apply to the component during a next frame, wherein the second $V_{GS}$ is determined based at least in part on image data for the next frame, the sensed first current, and the sensed second current; and applying the second $V_{GS}$ to the component of the electronic display during the next frame, wherein the next frame immediately follows the test frame.

4. The method of claim 1, wherein the test frame is less than 20 ms.

5. The method of claim 1, wherein determining the ΔTG comprises interpolating the first $V_{GS}$ with a lookup table.

6. The method of claim 5, wherein the lookup table comprises four or fewer sets of $V_{GS}$ values and ΔTG values for the component.

7. The method of claim 1, wherein the component comprises an organic light emitting diode (OLED) of the electronic display.

8. The method of claim 1, wherein the ΔTG is a fraction of the first $V_{GS}$ of the prior frame.

9. An electronic device comprising:
   an electronic display comprising a plurality of regions across the electronic display, wherein each region of the plurality of regions comprises a first organic light emitting diode (OLED) pixel configured generate an image on the electronic display; and
   a controller configured to apply control signals to the first OLED of each region of the plurality of regions, wherein the controller is configured to:
   apply a plurality of first control signals to a plurality of first OLEDs of the electronic display during a prior frame, wherein each first OLED of the plurality of first OLEDs receives a respective first control signal of the plurality of first control signals;
   determine a plurality of test gray shift (ΔTG) values, wherein each ΔTG value of the plurality of ΔTG values is based on a respective first control signal of the plurality of first control signals of the prior frame;
   apply a plurality of adjusted test gray (TG) voltages to the plurality of first OLEDs of the electronic display during a test frame, wherein the test frame is imperceptible on the electronic display, wherein each adjusted TG voltage of the plurality of adjusted TG voltages comprises a respective sum of a respective ΔTG value of the plurality of ΔTG values and a base TG voltage, wherein the plurality of adjusted TG voltages is configured to compensate for variations in the plurality of first control signals during the prior frame;
   sense, during the test frame, a first plurality of first currents of the first OLEDs in response to the plurality of adjusted TG voltages;
   apply a second plurality of second adjusted TG voltages to the plurality of first OLEDs of the electronic display during the test frame, wherein each second adjusted TG voltage of the second plurality of second adjusted TG voltages comprises a respective second sum of the respective ΔTG value of the plurality of ΔTG values and a second base TG voltage; and
   sense, during the test frame, a second plurality of second currents of the first OLEDs in response to the second plurality of second adjusted TG voltages.

10. The electronic device of claim 9, wherein the controller is configured to determine one or more parameters of each region of the plurality of regions based at least in part on the respective first current and the respective second current of the respective first OLED in the respective region of the plurality of regions.

11. The electronic device of claim 10, wherein the one or more parameters of each region comprises a temperature of the respective first OLED, an aging of the respective first OLED, or any combination thereof.

12. The electronic device of claim 9, wherein each region comprises a plurality of second OLEDs, and a pixel resolution of the plurality of first OLEDs with the plurality of second OLEDs is finer than a region resolution of the plurality of regions across the electronic display.

13. The electronic device of claim 9, comprising a memory configured to store a lookup table, wherein the lookup table comprises a three or more sets of voltage control signals and ΔTG values for each first OLED of the electronic display.

14. The electronic device of claim 9, wherein at least one value of the plurality of ΔTG values is a negative value.

15. A non-transitory, computer-readable medium comprising executable instructions for a processor of an electronic device, the executable instructions comprising instructions to:
   apply a plurality of gate-to-source voltage ($V_{GS}$) signals to a plurality of components of an electronic display of the electronic device, wherein each component of the plurality of components receives a respective $V_{GS}$ signal of the plurality of $V_{GS}$ signals during a prior frame;
   determine a test gray voltage shift (ΔTG) value for each component of the plurality of components based on the respective $V_{GS}$ signal of the prior frame;
   apply a plurality of adjusted test gray (TG) voltages to each component of the plurality of components during a test frame, wherein the test frame is imperceptible on the electronic display, wherein the plurality of adjusted TG voltages for each component of the plurality of components comprises a first sum of the ΔTG value for a respective component and a first test gray (TG1) voltage, a second sum of the ΔTG value for the respective component and a second test gray (TG2) voltage, and a third sum of the ΔTG value for the respective component and a third test gray (TG3) voltage, wherein the plurality of adjusted TG voltages is configured to compensate for variations in the plurality of $V_{GS}$ signals during the prior frame; and
   sense, during the test frame, a plurality of sensed currents for each component of the plurality of components in response to the applied plurality of adjusted TG voltages to each component of the plurality of components, wherein the plurality of sensed currents comprises a first sensed current associated with the first sum, a second sensed current associated with the second sum, and a third sensed current associated with the third sum.

16. The non-transitory, computer-readable medium of claim 15, comprising instructions to:
   determine a temperature of each component of the plurality of components based at least in part on the plurality of sensed currents for each component of the plurality of components; and determine a second plurality of second $V_{GS}$ signals to apply to the plurality of components of the electronic display of the electronic device for a next frame immediately following the test frame, wherein each second $V_{GS}$ signal of the second plurality of second $V_{GS}$ signals is based at least in part on the temperature of the respective component of the plurality of components.

17. The non-transitory, computer-readable medium of claim 15, wherein determining the ΔTG value for each component of the plurality of components comprises comparing the respective $V_{GS}$ signal during the prior frame to a lookup table stored in the non-transitory, computer-readable medium, wherein the lookup table comprises three or more sets of $V_{GS}$ values and ΔTG values for each component of the plurality of components.

18. The non-transitory, computer-readable medium of claim 15, wherein the TG3 voltage is greater than the TG2 voltage, and the TG2 voltage is greater than the TG1 voltage.

19. The non-transitory, computer-readable medium of claim 15, wherein the respective component of the plurality of components receives a respective first adjusted TG voltage comprising the first sum, a respective second adjusted TG voltage comprising the second sum, and a respective third adjusted TG voltage comprising the third sum.

* * * * *